Feb. 13, 1951        H. M. FLEMING        2,541,507

PARTIAL PRODUCT MULTIPLYING MACHINE

Filed Nov. 20, 1945        17 Sheets-Sheet 1

WITNESS
George V. Hall.

INVENTOR
Howard M. Fleming
BY
Stuart Hilde, ATTORNEY

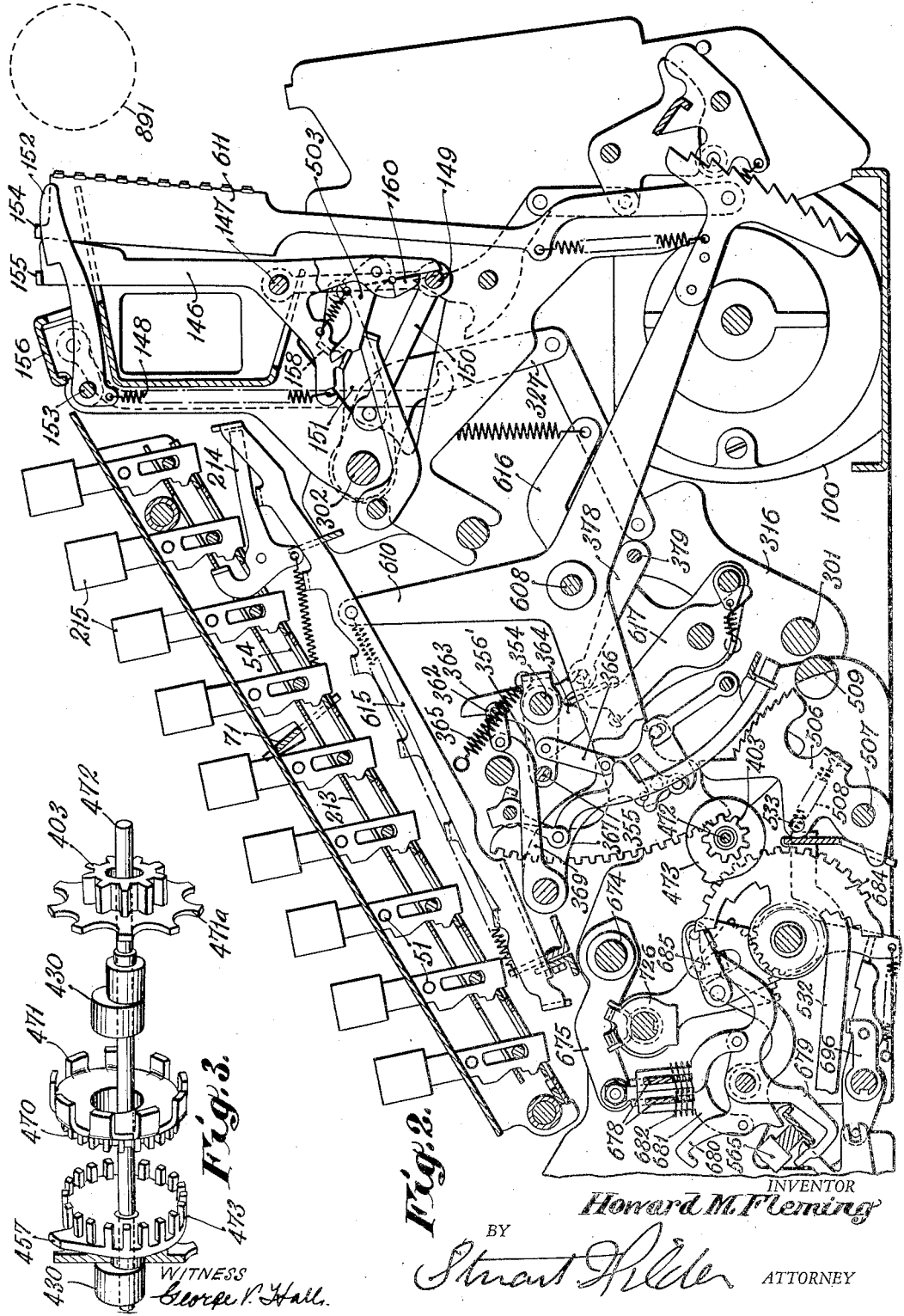

Feb. 13, 1951   H. M. FLEMING   2,541,507
PARTIAL PRODUCT MULTIPLYING MACHINE
Filed Nov. 20, 1945   17 Sheets-Sheet 3

WITNESS
George V. Hall

INVENTOR
Howard M. Fleming
BY
Stuart Wilder ATTORNEY

Feb. 13, 1951     H. M. FLEMING     2,541,507
PARTIAL PRODUCT MULTIPLYING MACHINE
Filed Nov. 20, 1945     17 Sheets-Sheet 4
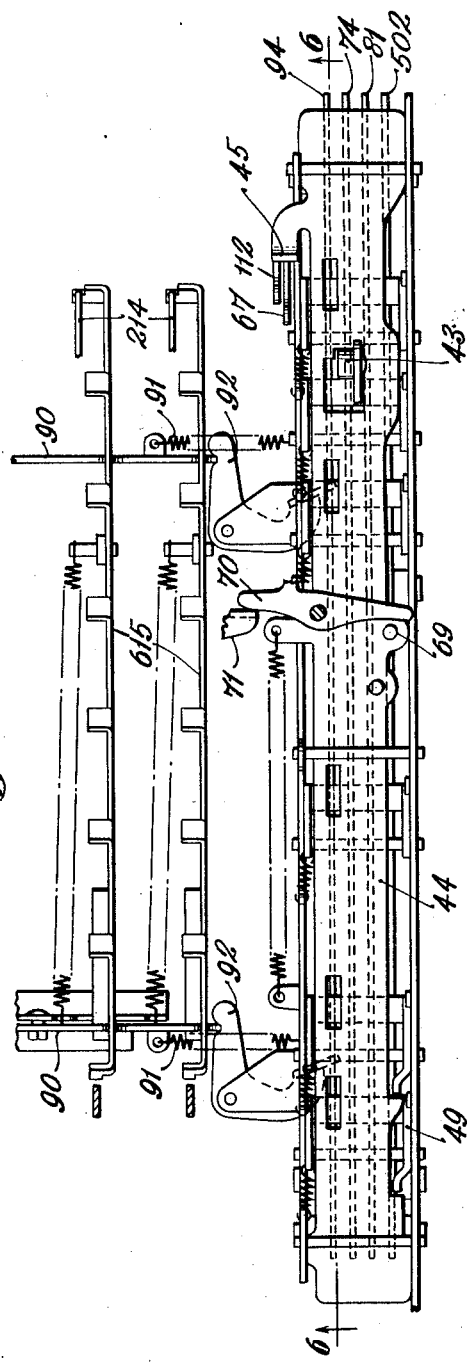

Feb. 13, 1951     H. M. FLEMING     2,541,507
PARTIAL PRODUCT MULTIPLYING MACHINE
Filed Nov. 20, 1945     17 Sheets-Sheet 5
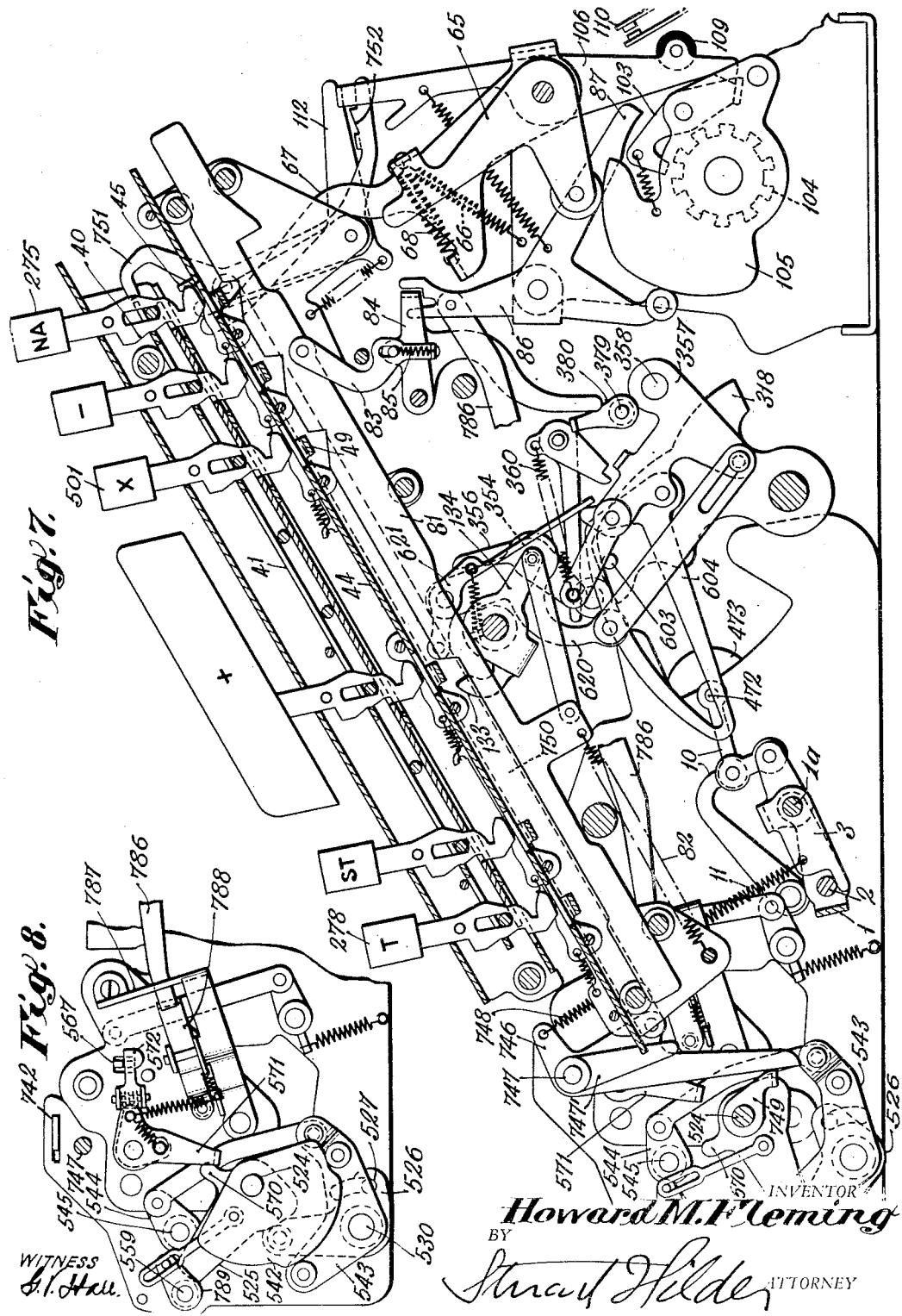
INVENTOR
Howard M. Fleming
BY Stuart Hilde
ATTORNEY
WITNESS
J. I. Hall

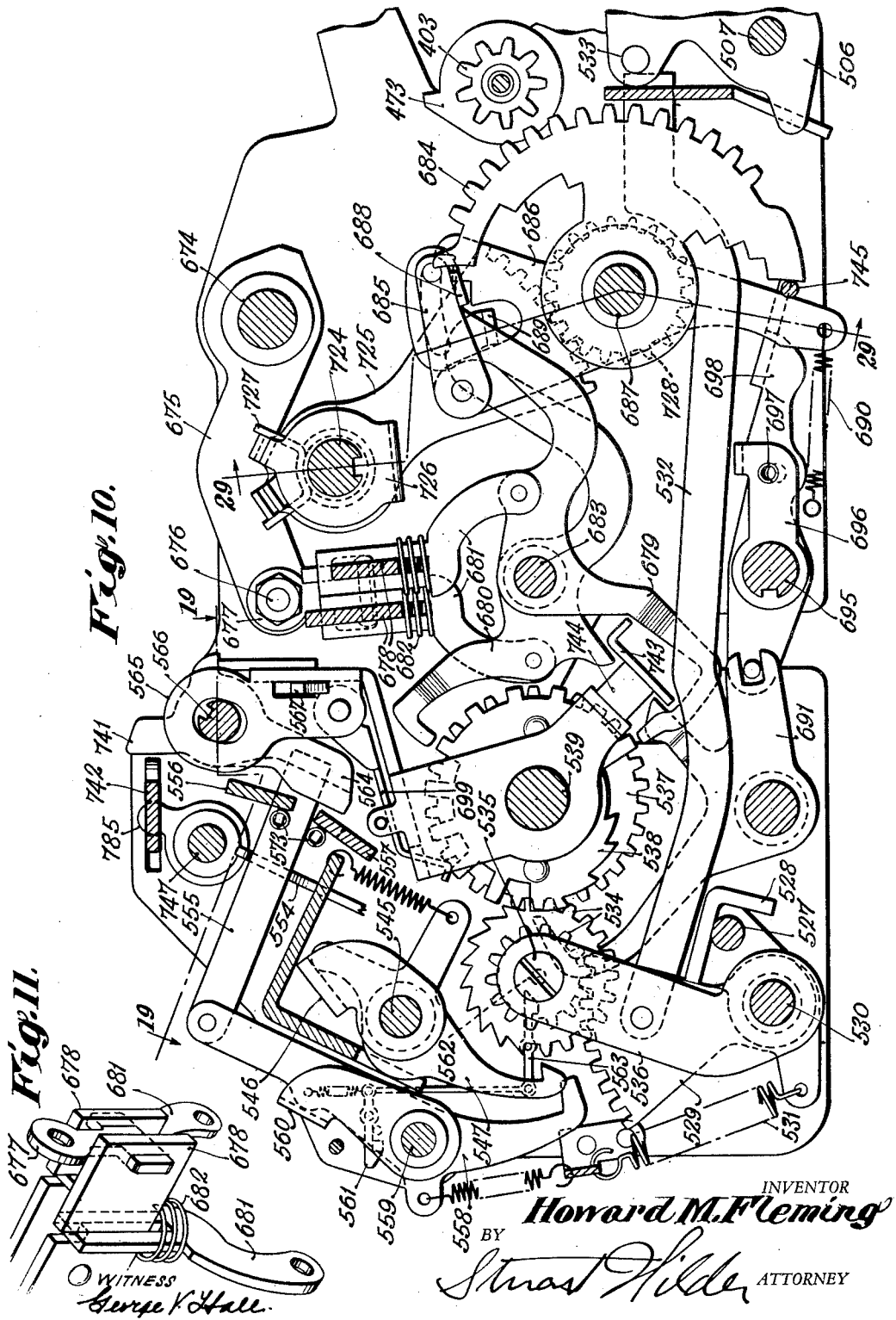

Feb. 13, 1951 H. M. FLEMING 2,541,507
PARTIAL PRODUCT MULTIPLYING MACHINE
Filed Nov. 20, 1945 17 Sheets-Sheet 8
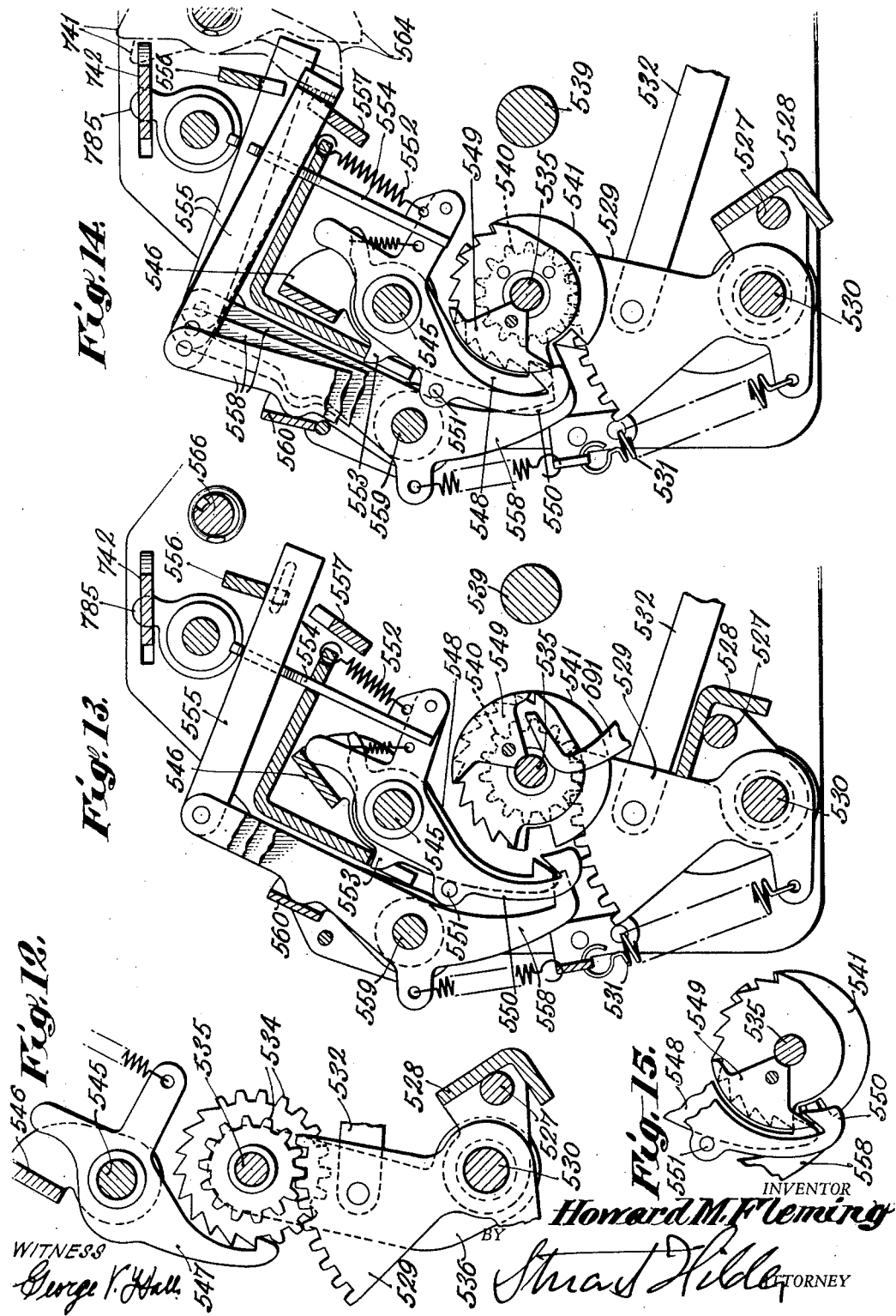
INVENTOR
Howard M. Fleming
BY Stuart Hill
ATTORNEY
WITNESS
George V. Hall

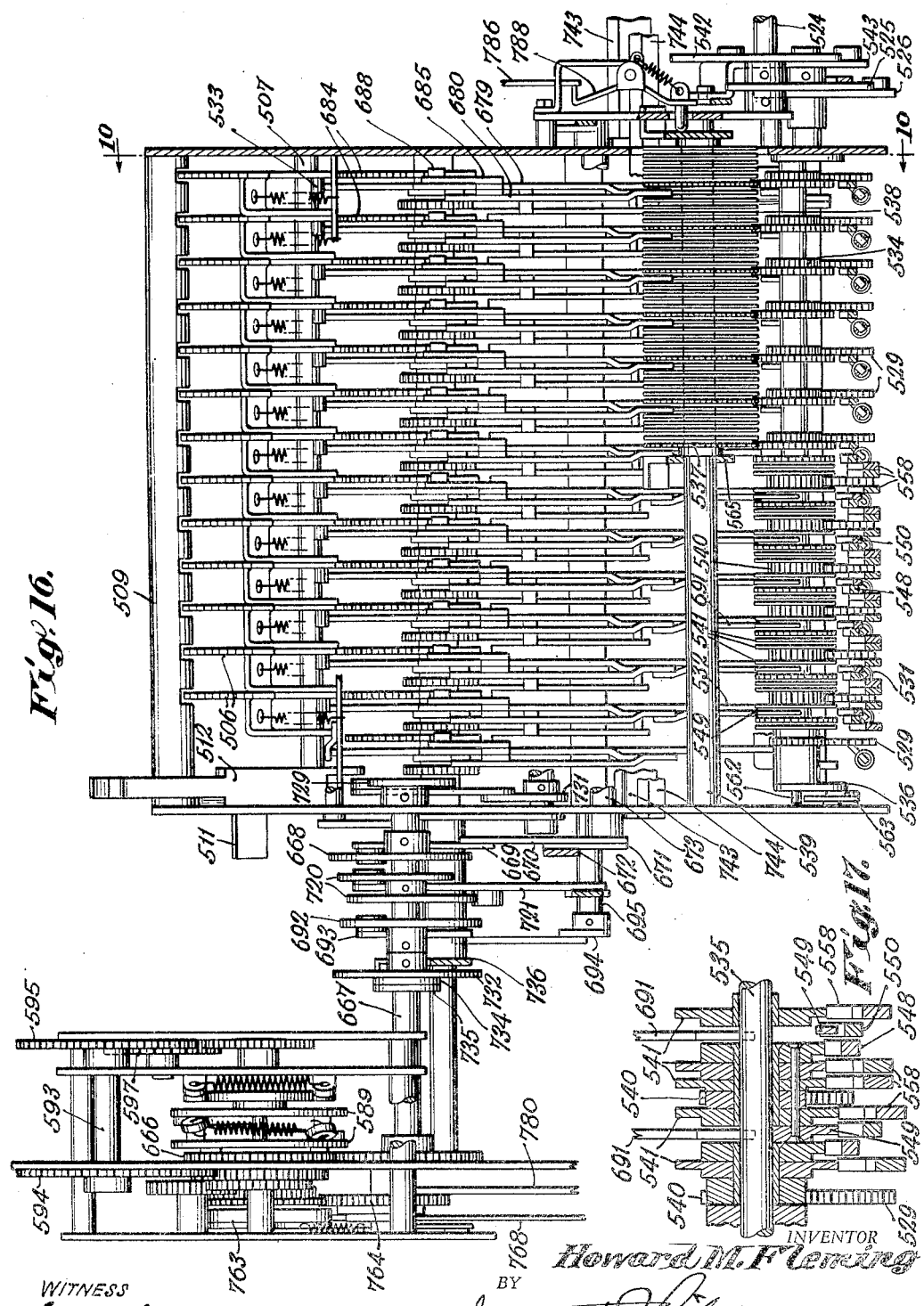

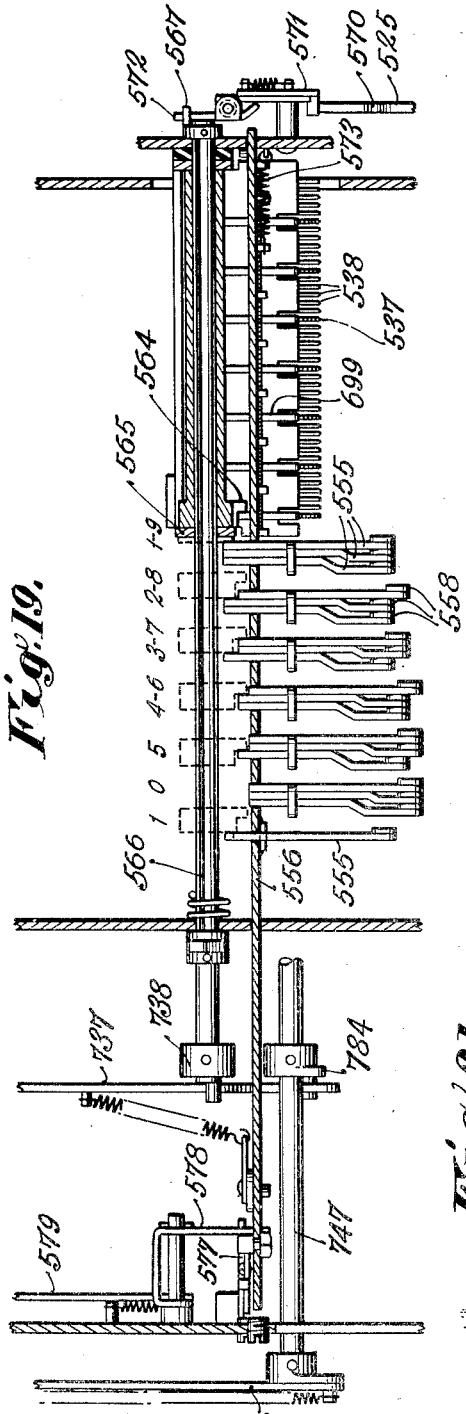

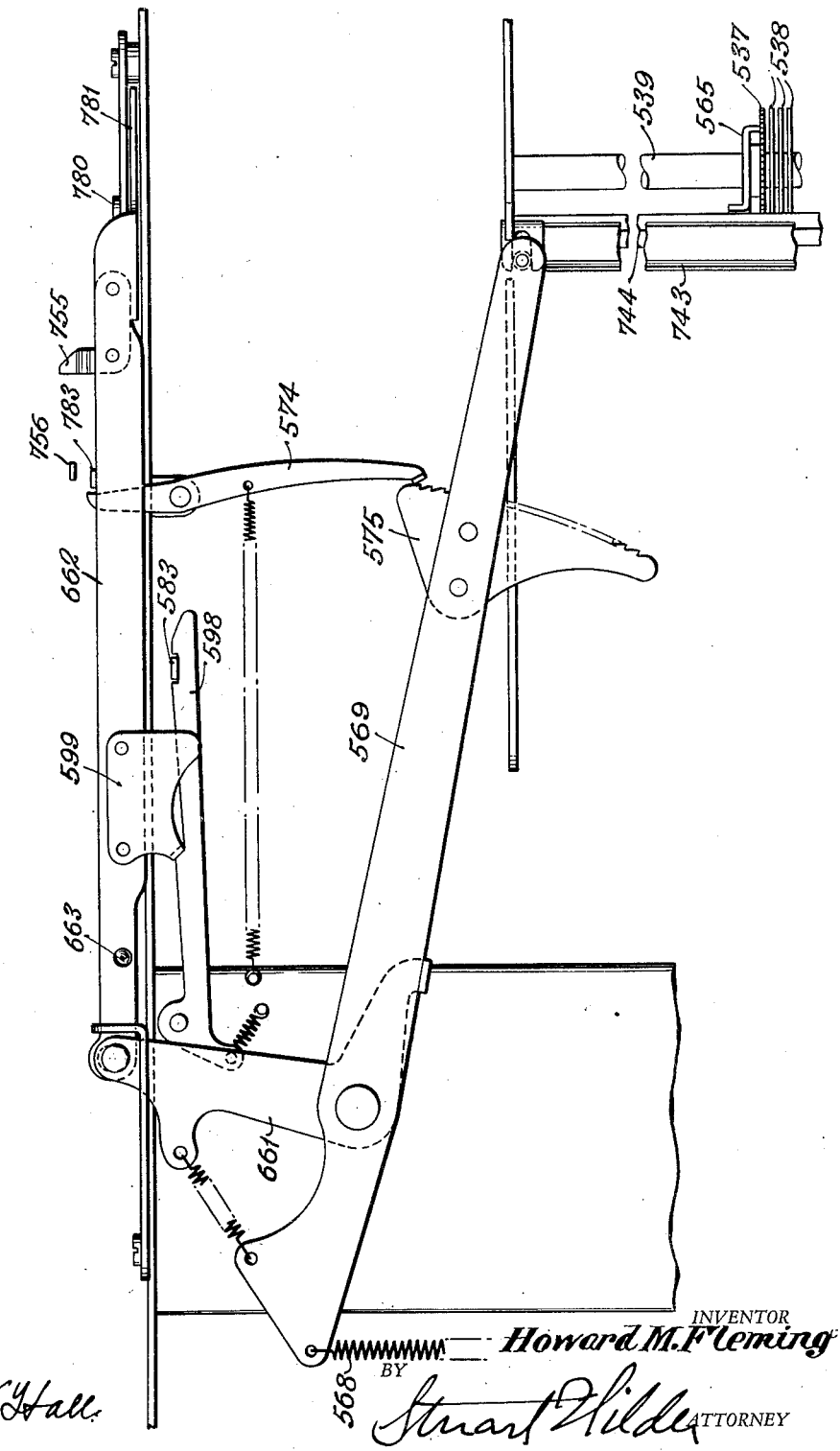

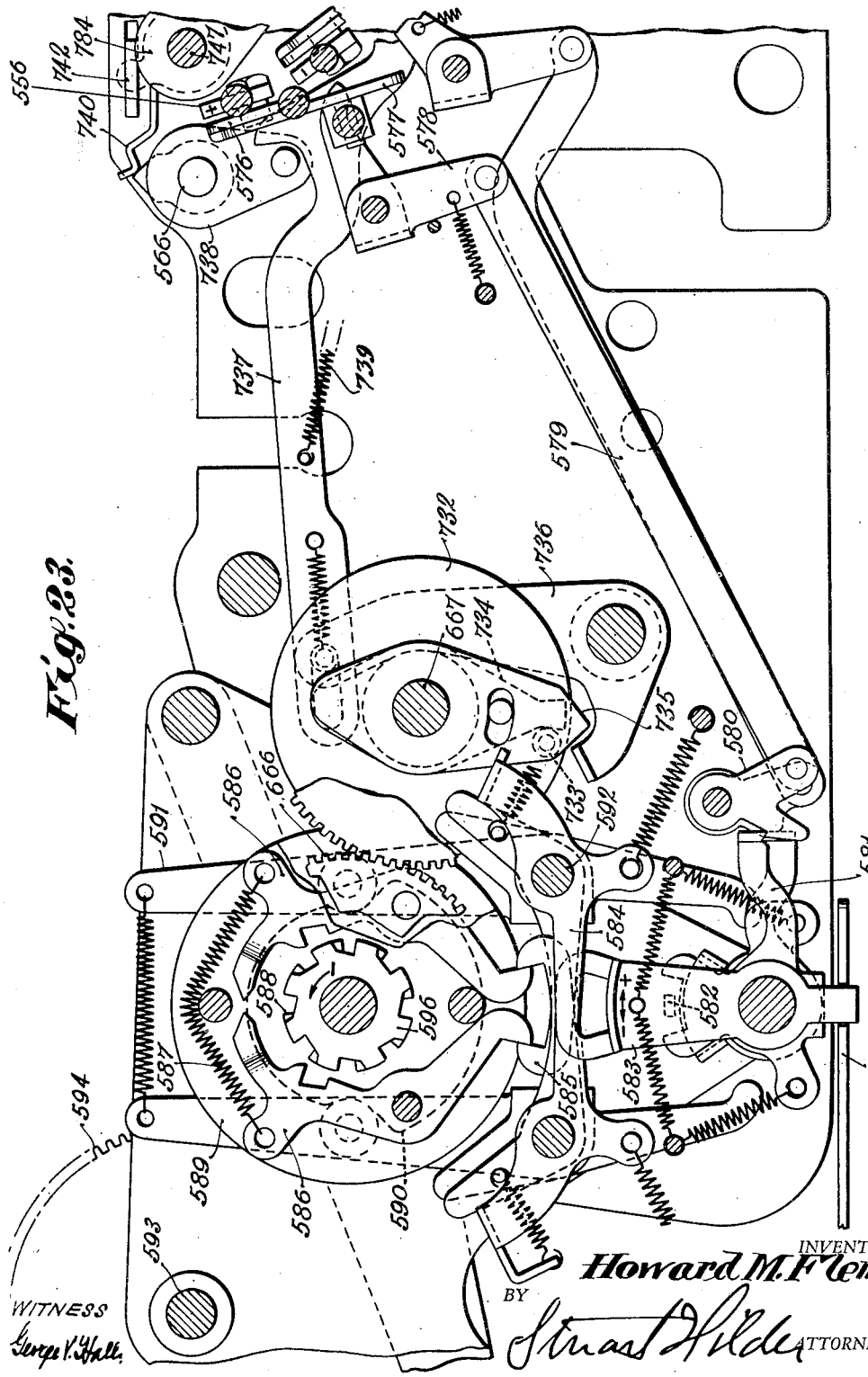

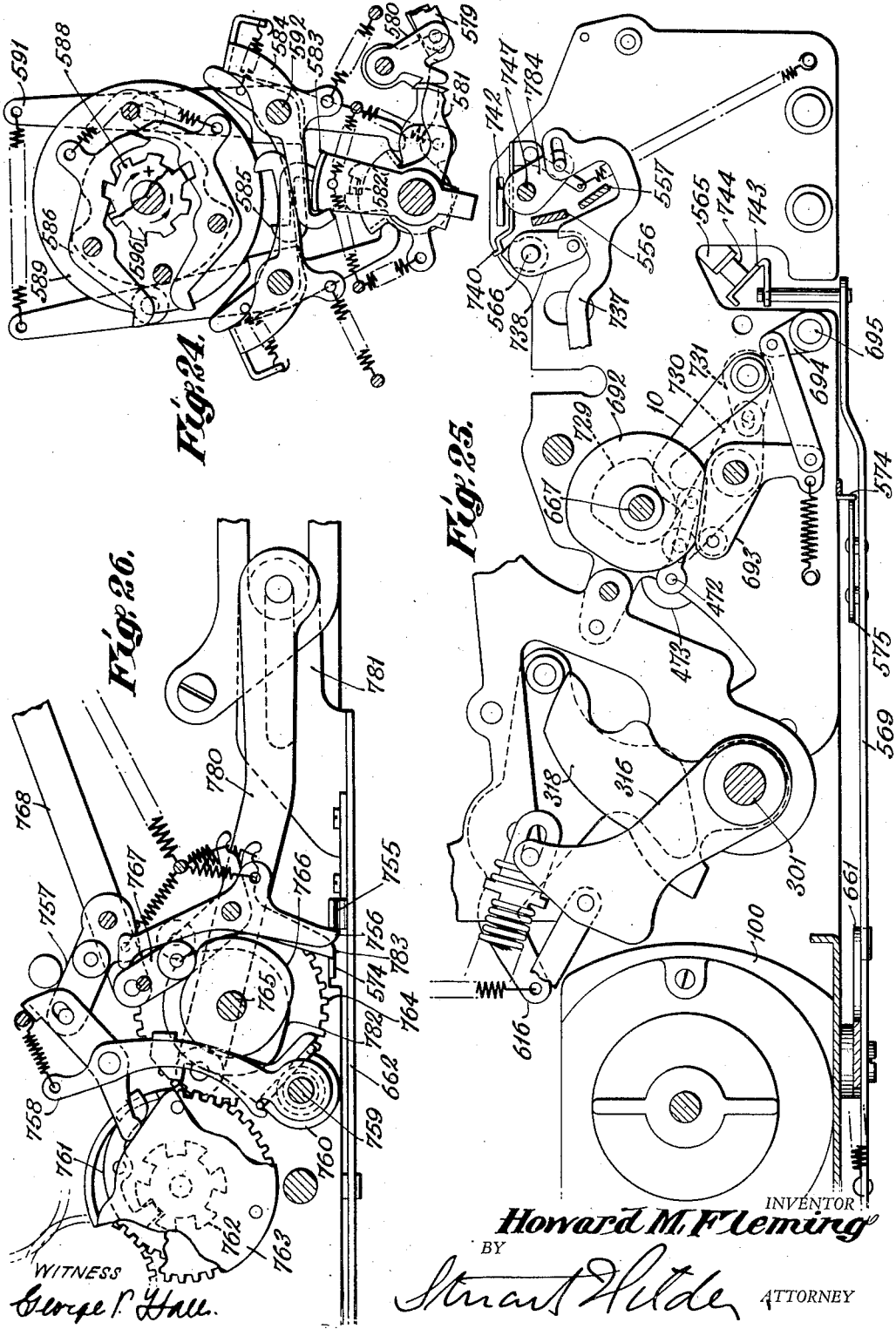

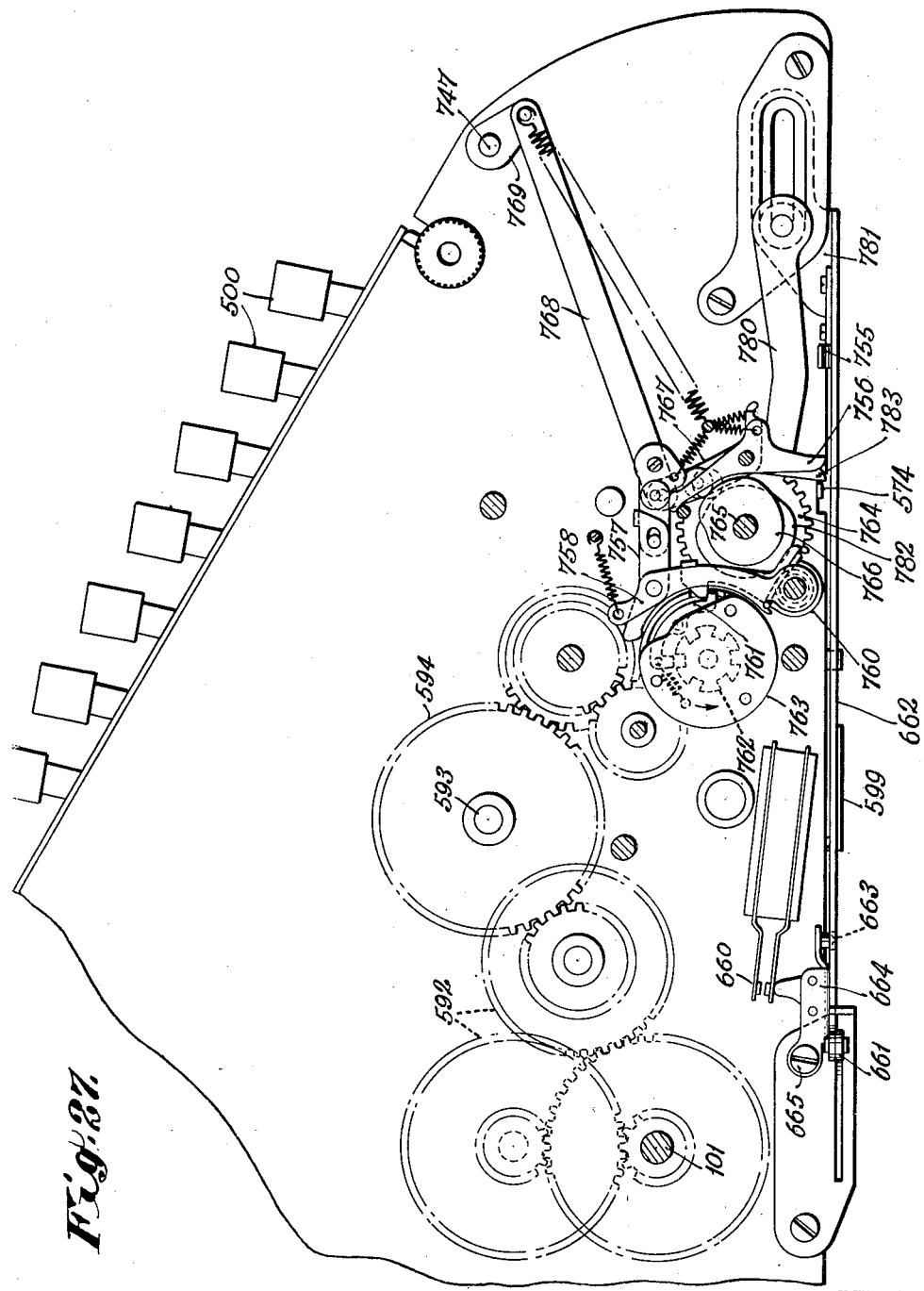

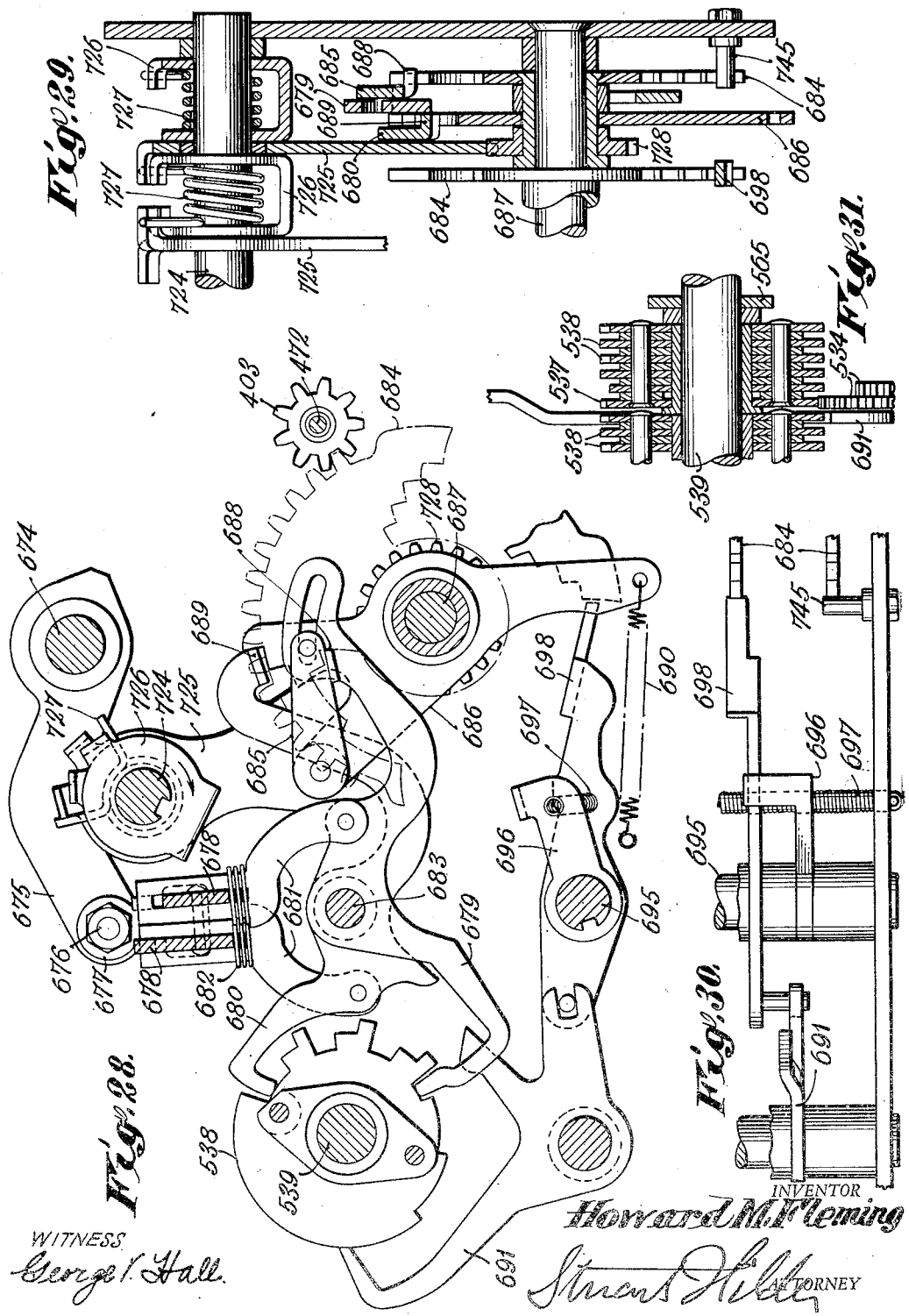

Feb. 13, 1951  H. M. FLEMING  2,541,507
PARTIAL PRODUCT MULTIPLYING MACHINE
Filed Nov. 20, 1945  17 Sheets-Sheet 16

WITNESS
George V. Hall

INVENTOR
Howard M. Fleming
BY
Stuart Wilde
ATTORNEY

Feb. 13, 1951     H. M. FLEMING     2,541,507
PARTIAL PRODUCT MULTIPLYING MACHINE
Filed Nov. 20, 1945     17 Sheets—Sheet 17

WITNESS
George V. Hall.

INVENTOR
Howard M. Fleming
BY
Stuart Wilder
ATTORNEY

Patented Feb. 13, 1951

2,541,507

UNITED STATES PATENT OFFICE 2,541,507

PARTIAL PRODUCT MULTIPLYING MACHINE

Howard M. Fleming, West Orange, N. J., assignor to Monroe Calculating Machine Company, Orange, N. J., a corporation of Delaware Application November 20, 1945, Serial No. 629,841

15 Claims. (Cl. 235—60)

1

The invention has relation to multiplying machines, and more particularly to machines in which partial products, represented in a series of registration control devices, are selected in accordance with the entered multiplicand and multiplier, for registration in a product totalizer.

In multiplying machines of a different type, wherein registration of a product is effected by repeated registration of the multiplicand, the time necessary to complete a calculation has been reduced by effecting the registrations controlled by the higher value multiplier digits complementally. According to one feature of the present invention, a modification of this semi-complemental system of registration has been employed in order to reduce the number of partial product devices and thus to effect various other improvements in the structure and operation of the machine.

The invention consists in the novel construction and combination of parts, as set forth in the appended claims.

In the accompanying drawings, illustrating the invention:

Fig. 2 is a vertical section taken through the factor keyboard of the machine.

Fig. 3 is a detail exploded perspective view of an accumulator wheel.

Fig. 5 is a detail plan view of the operation controlling slides and index bars.

Fig. 6 is a detail section on line 6—6, Fig. 5.

Fig. 7 is a vertical section taken on line 7—7, Fig. 1.

Fig. 8 is a detail right side elevation of certain factor entering parts, incompletely shown in Fig. 7, and illustrated in operated position.

Fig. 10 is a section taken substantially in line 10—10, Figure 16.

Fig. 11 is a detail perspective view of a portion of the units feeler actuating means.

Fig. 12 is a detail right side elevation of the multiplicand setting means.

Fig. 13 is a detail right side elevation of the multiplier setting means, with the parts located in normal position.

Fig. 14 is a similar view with the parts shown in an adjusted position.

Fig. 15 is a detail right side elevation of the

2 multiplier selection plates, shown in another position of adjustment.

Fig. 16 is a plan view of the product computing unit and associated parts.

Fig. 17 is a detail axial section through the multiplier selection plates.

Fig. 18 is a detail section showing the carriage latch.

Fig. 19 is a section taken substantially on line 19—19, Fig. 10.

Fig. 20 is a perspective view of the carriage escapement means.

Fig. 21 is a detail front elevation of certain plus, minus operation selection means.

Fig. 22 is a bottom plan view of the carriage shifting and return means.

Fig. 23 is a left side elevation of the two way drive clutch and associated parts.

Fig. 24 is a similar view of said clutch, shown in an operating position.

Fig. 25 is a left side elevation showing various multiplication control devices.

Fig. 26 is a left side view of the carriage return clutch and associated parts, shown in partially operated position.

Fig. 27 is a left side elevation of the machine, with casing removed.

Fig. 28 is a detail right side elevation of the partial product transmission means.

Fig. 29 is a section taken on line 29—29, Fig. 10.

Fig. 30 is a detail plan view of the tens feelers and associated parts.

Fig. 31 is an axial section through the partial product plates.

Figure 32:
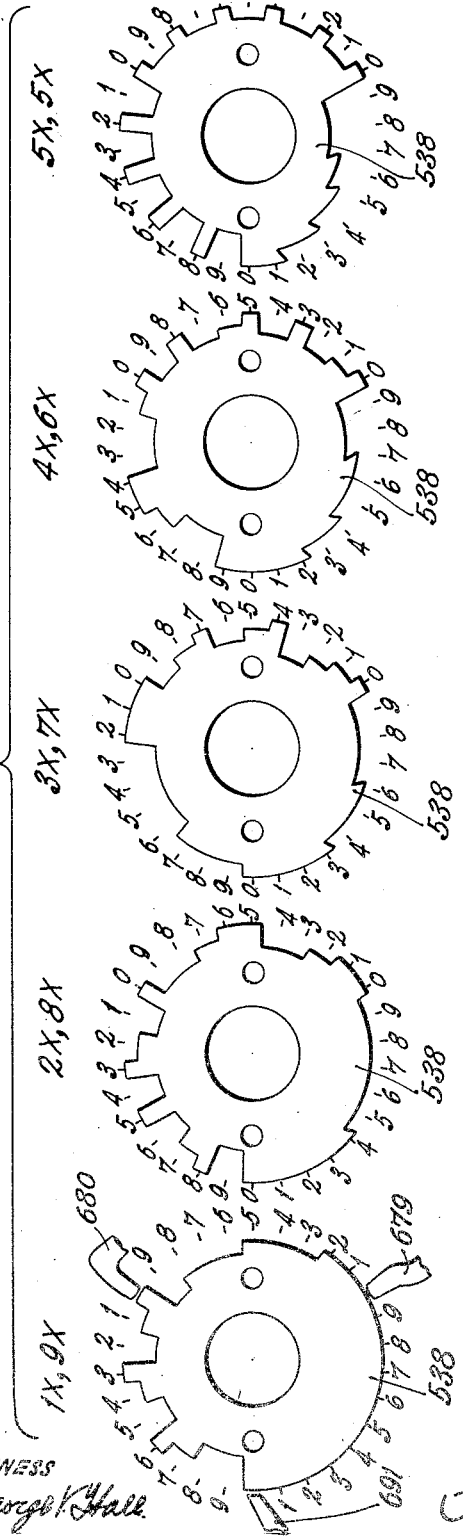

Fig. 32 is a series of detail elevations showing the five partial product plates.

Figure 33:
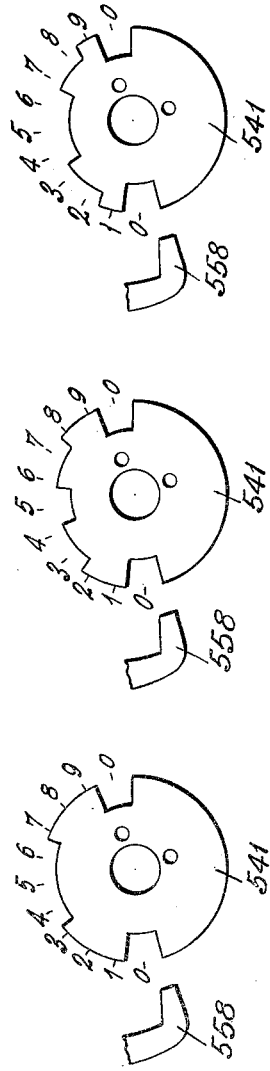

Fig. 33 is a series of detail elevations showing the three multiplier selection plates.

Figures 34, 35:
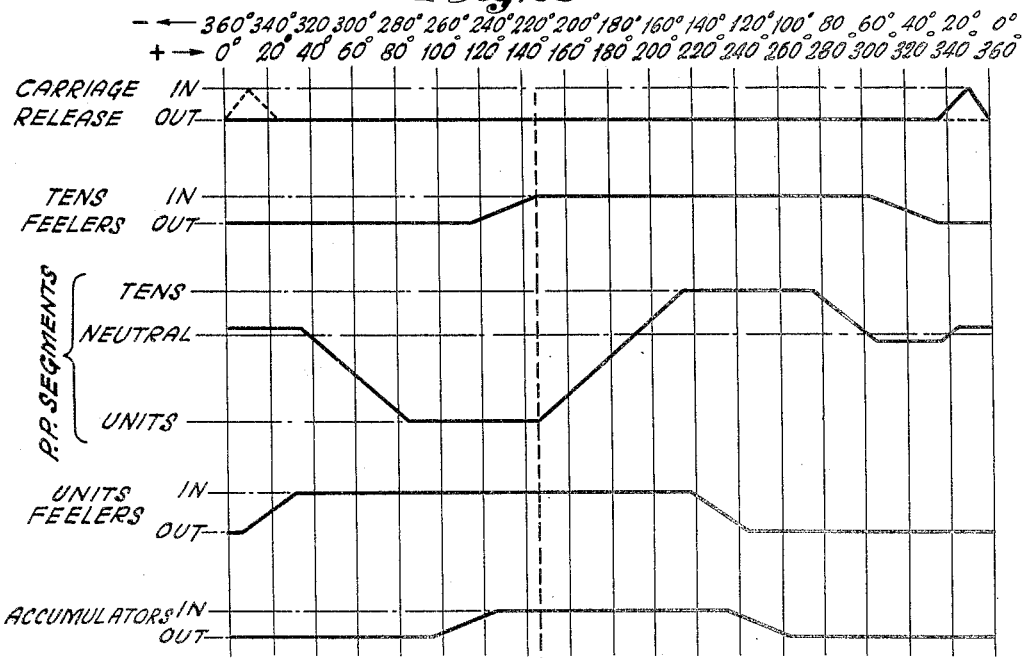

Fig. 34 is a table showing the partial product values and illustrating the system of multiplication.

Fig. 35 is a timing diagram illustrating the movements of various parts.

THE LISTING MACHINE

The multiplying mechanism forming the subject matter of the present invention is applicable to listing adding machines of widely varying construction. In the present disclosure it is shown as applied to the structure of the known Monroe adding-listing machines, illustrated in United States Patents 2,055,623; 2,261,341; 2,307,669; 2,330,270; 2,330,689 and 2,348,789, issued to Loring P. Crosman.

In accordance with these disclosures, amounts set up by the digit keys 215 (Figs. 1, 2) may be transferred to an accumulator 473, upon operation of the machine, by means of a series of differential actuators 610 which also serve to set the appropriate type on the printing line. These differential actuators are spring operated, and are normally restrained by frame 616. Each actuator 610 is formed as a three armed lever, fulcrumed at 668, the forward arm thereof having segmental gear teeth for rotating an accumulator wheel; the upper arm being pivotally connected with a digit index bar 615, and the rearward arm being pivotally connected with a type bar 611 of the printing mechanism. The actuators are normally held under restraint of a series of column latches 214, each latch being releasable upon depression of any key 215 in the same column by means of a slide 213. Upon operation of the machine and consequent movement of the frame 616, the released actuators will be rotated counter-clockwise each until stopped by contact of a lug of the related index bar 615 with the stem of a depressed key. This movement will bring given type of the bars 611 opposite the printing line of the record sheet and may also regulate the degree of rotation of the accumulator wheels 473, should the pinions 403 of said wheels be maintained in mesh with the segment teeth of actuators 610 either during the counter-clockwise movement thereof or during their restoration to normal restrained position.

The accumulator 473 is provided with tens transfer mechanism of the "crawl" type, illustrated in Figure 3 of the drawings. Each numeral wheel of the accumulator includes a pinion 403, this pinion being coupled by engagement of members 471a, 471 with a floating gear 470. Floating gear 470 engages the internal gear teeth of numeral wheel 473 and is mounted upon an eccentric 430, fast upon a sleeve extending from the adjacent lower order numeral wheel. Movements imparted to pinion 403 are transmitted to numeral wheel 473 by rotary movement of floating gear 470, and at the same time rotation of cam 430 will carry the next higher order floating gear 470 in an orbit within the teeth of its numeral wheel gear 473, resulting in a movement of this higher order numeral wheel of one-tenth the extent of movement of the lower order wheel.

Since the actuators 610 are used in multiplication only to effect non-accumulating (commonly termed "non-add") and total taking operations, the present description will omit reference to the setting for addition and for subtraction. Similarly, although in practice a number of plural order accumulators 473, may be provided, we are here concerned with a single product accumulator, to which the drawings have been confined.

Non-add

Figure 9:
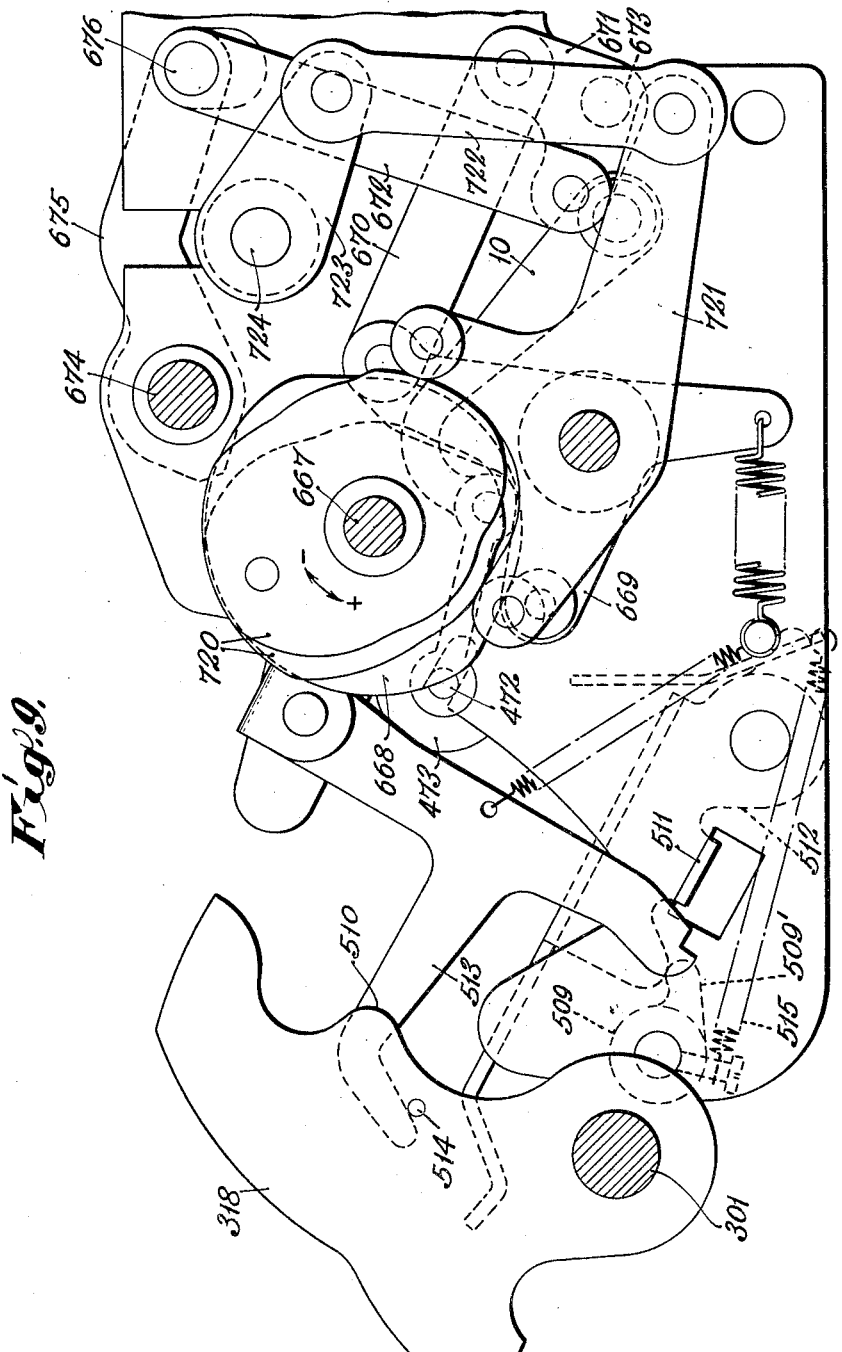
Fig. 9 is an enlarged left side elevation of the factor value locking means and of certain multiplication control cams.

A non-add operation is effected by the depression of a motor key 275 (Fig. 4), the stem of which is provided with a cam surface 40, acting in the depression of the key to move a slide 41 forwardly, thereby rocking a bell crank lever 42 and lifting a roller 43 thereof out of restraining engagement with a spring operated slide 44, illustrated also in Figs. 5, 6, 7. Upon release, slide 44 will move forwardly, a lug 45 thereof striking the upper arm of a pivoted latch 112 and releasing said latch from restraining engagement with a spring operated clutch control lever 106. Lever 106, being rocked counter-clockwise by its spring, an insulation roller 109 (Fig. 7) mounted on the lever will act to close a switch 110 in the circuit of an electric motor 100 (Figs. 2, 9), and the lower end of lever 106 will be disengaged from the tail of a spring urged clutch pawl 103, allowing said pawl to fall into engagement with the driving clutch member 104, driven by motor 100. Pawl 103 is mounted upon a plate 105, connected by link 108 with an arm 316, fast upon shaft 301, upon which shaft a cam 318 (Fig. 25) is also fast. Counterclockwise rotation of plate 105 will reciprocate arm 316 and cam 318, the latter acting to effect reciprocatory movement of the actuator frame 616 in known manner (see, for instance, Patent #2,055,623, above mentioned)

Operation of frame 616 will allow the type bars 611 to rise to printing position in those columns in which the column latches 214 have been released, lugs 154 of these type bars moving away from latches 152 (Fig. 2) and allowing them to rise, under influence of springs 148 into the path of movement of lugs 155 of spring impelled hammers 146. Hammers 146 are normally restrained by a bail 149, suspended from a shaft 147 and connected by links 150 with a rock arm 151, fast upon a shaft 302, upon which shaft is also fast an arm 327 having link connection with the motor driven arm 316. Thus, upon motor operation, bail 149 will be moved forwardly, permitting such hammers as have not been latched to rotate gradually in a clockwise direction, forcing the related type bars 611 toward but not into engagement with the surface of platen 891. Near the end of this movement of the parts a lug 158 of arm 151 will engage the depending hooked end of a releasing bail 156, pivoted at 153 and extending above the latches 152, the bail being rocked and the latches disengaged from the hammers 146. Therefore the hammers will be violently operated by the springs 148, imparting sufficient momentum to the type bars 611 to insure percussion contact with the record material supported on platen 891.

In order to effect printing of zeros by the type bars to the right of those displaced by the actuators 610, the hammers are provided with overlapping lugs 160 (Fig. 2), which will serve to hold any hammer to the right of one secured by its latch. In other words, a latch 152, upon movement of bail 153, will release its related hammer 146 and all hammers lying to the right thereof, for printing operations.

The accumulator pinions 403 (Fig. 2) stand normally in mesh with the segment gears of actuators 610, in which position they will remain during a non-add cycle of operation, so that any amounts subtracted from the accumulator wheels by the actuators during the forward stroke of the operating means will be added back during the return stroke. However, a timed unmeshing and meshing of these pinions is controlled by a switch 6 (Fig. 4), which stands normally in position to determine additive registration, and this switch must be adjusted to inactive position upon depression of the non-add key.

Switch 6 controls the accumulator through an adjustable arm 5 and cooperating means which will be described in connection with the total taking devices. The switch is set to inactive or non-add position by a slide 74, which is held normally under the tension of a spring 75 by engagement of the upper end of a lever 76 with a shoulder of the slide, lever 76 being provided with an anti-friction roller normally engaging the high point of the cam portion of plate 105. In the operation of the machine by clutch 103, 104 lever 76 will be reciprocated, and slide 74 will be allowed to move forward under the influence of spring 75 until a shoulder 78 of said slide contacts a bail 49 which has been displaced by the depression of non-add key 275. This partial movement of slide 74 is transmitted to switch 6 by means of an arm 79 (pivotally mounted upon the slide and held in relation thereto by the spring 75) and a link 80 connecting said arm with an arm of the switch. By this means switch 6 is rocked clockwise about its pivot point 33 so that cam surface 21 thereof will lie parallel with the end of a lateral flange 22 of arm 5. Flange 22 and switch 6 lie in the plane of a roller 7 mounted upon the reciprocatory arm 316, this roller, in the listing operation, moving idly above these parts, merely camming the forward end of the switch downward upon the forward and the return strokes of arm 316 without displacing arm 5.

At the beginning of a non-add operation the forward movement of slide 44 to engage the clutch will engage said slide over a shoulder 46 of the stem of key 275, thus holding the key depressed and switch 6 in set position until restoration of slide 44, near the end of the cycle of operation. This restoration of slide 44, which also effects the release of the set digit keys 215 and allows the disengagement of clutch 103, 104, is effected as follows:

An anti-friction roller mounted on a lever 65 (Fig. 7) will be engaged by a cam projection of plate 105 as it approaches its full-cycle position, the lever being rocked clockwise against tension of a spring 66 and carrying therewith a lever 67 connected thereto by a spring 68. The upper end of lever 67 will be moved by the cam into contact with the lug 45 of slide 44, retracting the slide to and rearwardly beyond its normal position of rest, this extra rearward movement being utilized to clear the digit keyboard. For this purpose a pin 69 on slide 44 is brought into contact with one arm of a lever 70 (Fig. 5) intermittently fulcrumed upon a frame plate of the keyboard, rocking said lever into contact with a shutter plate 71 (see also Fig. 2) having lugs engaging shoulders of the key latching slides 54. Slides 54 will thus be moved forward, releasing the depressed keys 215 for restoration by their springs 51. As plate 105 arrives in full cycle position, lever 67 will be allowed to return to its forward position, and slide 44 will follow it until roller 43 falls into latching engagement therewith, this movement of the roller being permitted by the unlatching of key 275 upon rearward movement of slide 44.

*Total taking*

As is usual in listing machines, totals are printed by disengaging the actuators 610 from their column latches 214 and from the frame 616 and allowing them to move subtractively under the influence of their springs, to rotate the accumulator wheels to zero, in which position the wheels are held by engagement with appropriate stops, after which the cycling of the machine will effect operation of the printing means and restoration of the actuator segments 610.

These and other special functions are effected upon depression of the total key 278 (Fig. 4), under control of slide 74 and other spring slides lying beneath the bails 49 of the operating keys.

Depression of total key 278 will release slide 44 and start motor operation, as previously described and will also allow full movement of slide 74, to provide for subtractive operation, because there is no shoulder on slide 74 which may contact with the bail 49 of total key 278. The resulting movement of slide 74 to its extreme forward position will rock switch 6 clockwise about its pivot 33, whereby cam surface 21 of the switch will lie out of path of movement of roller 7, so that arm 5 will not be displaced and the accumulator wheels will remain in mesh with the actuator segments 610 during the forward stroke of frame 616. At the end of the forward stroke roller 7, having momentarily displaced and passed beyond the switch, will lie directly in front of the surface 34 of the switch, with which it will engage during the return stroke of the operating mechanism, to raise arm 5 and disengage the pinions from the segments before additive movement thereof has started.

Lifting of arm 5 effects this disengagement by means of a rocker plate 419 (Fig. 4) having yieldable spring connection 4 with said arm and to which is rigidly attached at 1a (Fig. 7) an arm of a bail 1, pivoted, in common with plate 419, upon a shaft 2. The arms of bail 1 are provided with extensions 3 having link connection with the joints of toggles 10, each pivoted at one end to the framing of the machine and at the other end to the ends of the accumulator shaft 472. The bail extensions 3 are pivotally mounted upon studs 1a and are yieldably held in contact with shaft 2, so that they will normally move with bail 1, by springs 11. Shaft 472 is mounted in guide slots of the machine frame and is held normally in rearward adjusted position by the springs 4 and 11. Lifting of arm 5 will rock plate 419 and bail 1 move shaft 472 forward, to disengage the accumulator pinions from the actuator segments 610.

The accumulator wheels are rotated to zero registering position under control of a slide 81 (Fig. 7), which is locked out of operation by the bails of the non-add and other operating keys but which will be free to move, under the influence of its spring 82 upon forward movement of arm 76 in total taking. Slide 81 has link connection with an arm 134, pivoted upon the machine frame and provided with a finger 133 which will be brought during the movement of slide 81 into contact with an arm 621 pivotally mounted upon a rock lever 620. Lever 620 has link connection with a toggle 357, one member of which is pivoted upon the framing of the machine at 358, the other member being pivoted to one of a pair of plates 356, fast upon shaft 354. Fast with plates 356 are arms 356' (Fig. 2) supporting a rod or bail 355 extending beneath a series of latches 369 having link connection 362 with members 363, freely rotatable upon shaft 354 and provided with tripping fingers 364 adapted under the influence of springs 365 to disengage the segment latches 617. Upon breaking of toggle 357 by slide 81 bail 355 will be moved downwardly under the influence of spring 360 (Fig. 7), allowing the latches 369 to be operated at the proper times to trip the segment latches 617.

Members 363, controlling the segment latches, also act, through links 366 to move zero stops 367 (Fig. 2) so that shouldered portions thereof will be brought into the paths of movement of shouldered index stops 457, formed upon the accumulator wheels 473; whereby the wheels will be arrested and held in zero registering position, against the pull of the actuator segment springs.

The zeroizing of the accumulator wheels is effected by successive operation of the wheels from right to left of the accumulator, the latches 369, with their links, forming toggles which are successively broken as described in Patent 2,261,341, hereinbefore referred to. In order to give time for the completion of this spring actuated zeroizing movement, the motor operation is interrupted as follows:

Upon forward movement of totalizer slide 81 (Fig. 7), a link 83, pivotally connected with the slide and having pin and slot engagement with a latch 84, will act to tension a spring 85 connecting the link and latch, thus engaging the free end of the latch with the shoulder of an arm 86. Arm 86, pivoted upon the machine frame has an anti-friction roller engaging the cam surface of plate 105 and a rearward extension 87 lying normally adjacent to the path of rotary movement of clutch pawl 103. During the first part of the cycle of the operating means the roller of arm 86 will climb to the high point of the cam, rotating arm 86 clockwise, to bring its extention 87 into the path of movement of pawl 103, and allowing latch 84 to fall into a notch formed in the upper end of said arm. Clutch pawl 103, engaging extension 87, will be lifted out of engagement with the driving member 104 of the clutch and so held until the left hand toggle latch 369 is broken, to complete the zeroizing action. The member 363 related to this left hand latch 369 has pin and slot engagement with a lever 378 (Fig. 2), fast upon a shaft 379, upon which shaft is secured a lever 380 (Fig. 7), operable, upon movement of said member 363 to engage a depending arm of latch 84 and lift the latch out of engagement with arm 86, whereupon said arm will be moved by its spring to lift extension 87 out of restraining contact with clutch pawl 103.

The latches 369 and parts controlled thereby are restored to normal condition during the resumed total printing cycle by the restoration of toggle 357, this being effected through a slotted plate 604 (Fig. 7), pivotally connected with one link of the toggle. A pin 603, mounted upon cam 318 which reciprocates with the arm 316, engages during the forward movement of the parts with the end wall of the slot of plate 604 to restore the toggle to latching position.

During the total taking operation the index bars 615 are shifted laterally out of position of engagement with the stems of the digit keys 215 and the column latches 214. Accordingly the index bars are supported in sliding plates 90 (Fig. 5), urged toward the right hand side of the machine by springs 91, and the ends of the plates are engaged by a pair of bell crank levers 92 provided with shoulders engaging lugs 93 (Fig. 6) of a slide 94. Slide 94 lies parallel with the slides 74 and 81, and is likewise reciprocated by the operation of lever 76, being moved toward the front of the machine under the influence of the springs 91 as said springs displace the index bars. Bails 49 of the non-add and other operation keys are depressible into position in front of the shoulders 95 of the slide, to prevent operation thereof.

All of the above described mechanisms are of known construction and are fully described in the patents hereinbefore referred to. While they are all essential to a complete multiplying operation and in some cases cooperate directly with the product computing devices, it is not essential that the structures of the present disclosures be employed, since they have many functional equivalents insofar as multiplication is concerned.

MULTIPLICATION

According to the present disclosure five partial product plates, each representing the products of a single multiplier digit, are employed to control registration of all the products of any multiplicand digit of the decimal system, multiplied by any multiplier digit of that system. Obviously, if the invention were applied to a non-decimal system of notation, the number of plates would vary accordingly.

Figure 34, in which the products related to single digit multipliers are tabulated, shows how this result is accomplished. The upper lines of figures of this diagram represent the values of the conventional multiplication table related to the multiplier digits 1 to 5, these figures being registered either additively or subtractively. The lower line of figures are repetitions of the 1 multiplier table, increased by ten, and represent the additive values to be registered in conjunction with the related subtractive values of the upper line. The right and left marginal notations of the diagram show that the products of the multiplier digits one to four are additively accumulated in the usual manner; that those related to the digits six to nine are computed by subtraction of the product of the complemental multiplier digit, together with the addition of a value representing ten times that of the multiplicand, and that the products of the multiplier five may be registered either normally or complementally. Ten times the value of the multiplicand is registered by shifting the plates over to the next higher accumulator orders and using the one multiplier plate. Obviously, in single multiplier computations, this will require an extra cycle of registration, but, by a further refinement, this extra cycle is dispensed with whenever a multiplier value is set in the next higher order, in which case this higher order setting will be shifted to the plate of next higher multiplier digit value.

Thus, for example 775 will be multiplied by 394 in the following manner:

$$
\begin{array}{rr}
394 \times 775 & \\
4 \times 775 = & 20 \\
& 28 \\
& 28 \\
\hline
& \phantom{0}003100 \quad \text{1st cycle} \\
-10 \times 775 = & -7750 \\
\hline
& -995350 \quad \text{2nd cycle} \\
400 \times 775 = \phantom{0}2000 & \\
2800 & \\
2800 & \\
\hline
& 310000 \\
\hline
& 305350 \quad \text{3rd cycle}
\end{array}
$$

Selection of the multiplier plates which are to be put in control of the registration is effected by shifting the plates relative to the feelers by which the partial product values are transferred to the accumulator, this shifting being merged with the ordinal shift according to the principles set forth in United States Patent No. 2,342,529, issued to George C. Chase on February 22, 1944.

The product accumulator, which is meshed with the previously described lister actuators in entering the factors and in printing the product, is unmeshed therefrom and meshed with a set of auxiliary actuators or partial product segments during the accumulation of a product.

It may be noted from an inspection of Figure 34 that the semi-complemental system of the present invention has been applied to a multiplication table of conventional arrangement, However, various modifications of this basic table have been proposed in the prior art (see, for instance, Patent 2,342,529, above referred to), and it is not suggested that the invention should be limited thereto. Similarly, the method of selecting the multiplier might be effected by means other than that employed to effect the ordinal shifting.

With this outline of the principles of operation of the multiplying devices, we will turn to a detailed description of the mechanism involved.

*Entering the factors*

Figure 1:
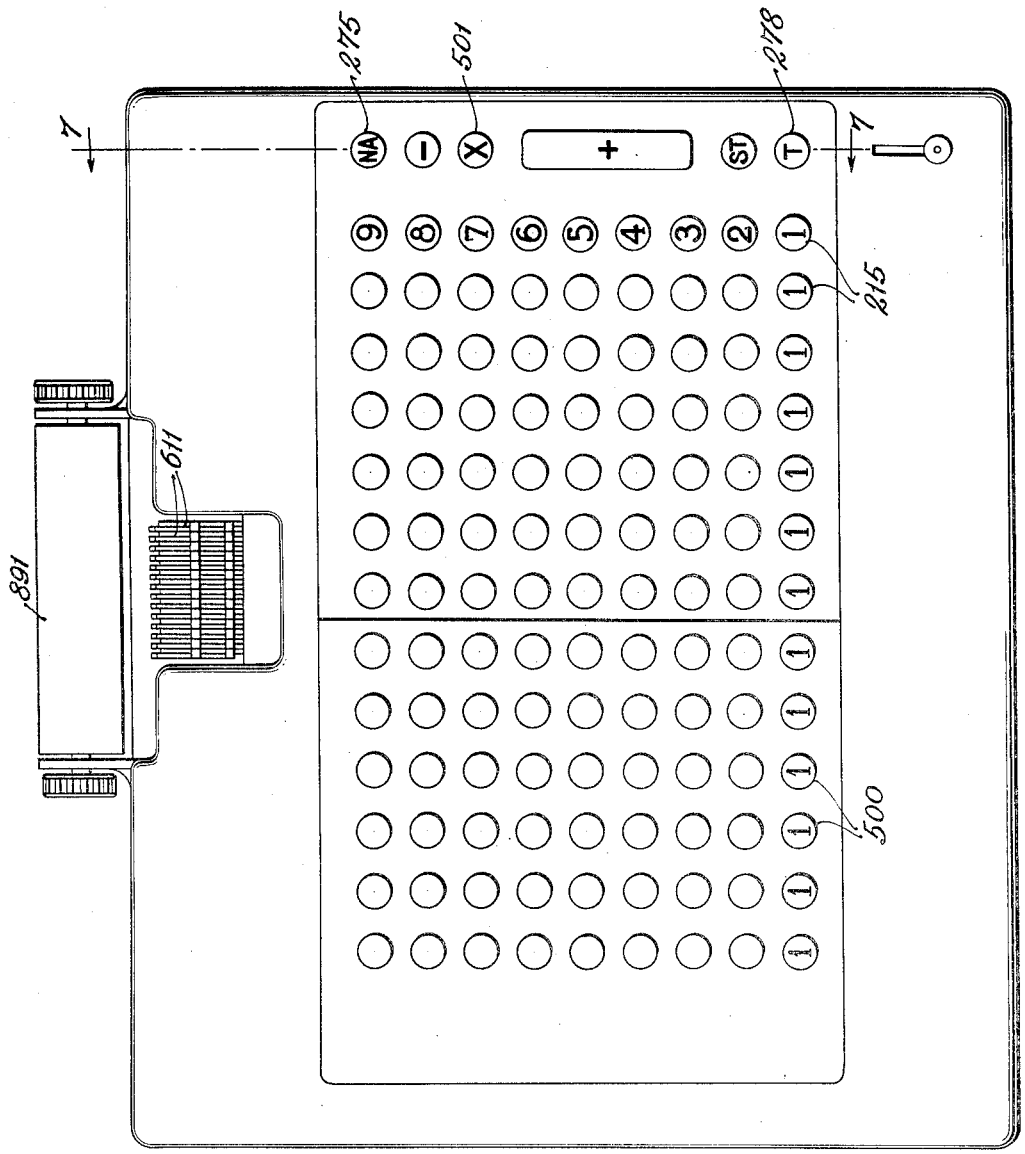
Fig. 1 is a plan view of a listing machine to which the invention has been applied.

The multiplicand is set up on the keys 215 and the multiplier upon keys 500 (Fig. 1). These keys 500 are duplicates of the keys 215 and control the movements of their related actuators 610 in the same manner.

Therefore depression of the multiplication key 501, which provides among other things for a non-add operation of the machine, will effect printing of the factors in the manner previously described.

This multiplication key 501 (Figs. 1 and 4), upon depression, moves its bail 49 into the path of a shoulder 79 of the non-add slide 74 normally spaced therefrom by an interval corresponding to that between bail 49 related to the non-add key and its corresponding shoulder 78. The relation of the multiplication key to the other previously described locking and registration controlling slides is also identical to that of the non-add key 275.

Additionally, however, the bail 49 of the multiplication key permits movement of a spring impelled slide 502, upon operation of lever 76, which movement is prevented upon depression of the other operating keys by contact of the related bails with closely adjacent shoulders of said slide. This multiplication slide has three functions; to split the printing mechanism, so that the printing of the multiplier will not effect the printing of zeros in the multiplicand zone; to control storage of multiplicand and multiplier values in the machine, and to control the calculation and printing of the product.

In order to split the printing, the overlapping lugs 160 (Fig. 2) are omitted between the printing hammers of the seventh and eighth columns, their function being normally performed by a spring latch 503, pivotally mounted upon one of said hammers and engaging a lug formed in the other hammer. The slide 502 (Fig. 4) is provided with a pin 504 which, upon forward movement of the slide, will contact one arm of an intermediately fulcrumed lever 505, the other arm of which (Fig. 2) contacts with the latch 503, continued movement of the slide disengaging said latch and thus breaking the connection between the two hammers.

The setting movements imparted to the actuators 610 during the forward stroke of cam 318 are transmitted to related stop plates 506 (Fig. 2), loosely mounted upon a shaft 507 and held in contact with the actuators by springs 508. At the end of this forward stroke the stop plates are locked in adjusted positions by engagement of a rotary bar 509 with graduated faces of said plates. Bar 509 is rocked into locking engagement with the stop plates 506 by contact of a projection 510 (Fig. 9) of cam 318 with a lug 511 of pivoted arm 512, contacting an arm 509' of said bar, the locking engagement being maintained during the return stroke of the cam by engagement of a spring latch 513 with lug 511. At the end of the return stroke of the parts, latch 513 will be lifted by a pin 514 mounted in the cam, and bar 509 will be rocked to unlocking position by a spring 515.

During that portion of the preliminary non-add cycle in which the multiplicand and multiplier values are locked in the plates 506, a series of feelers will be brought into contact with said plates, whereby the values will be entered in the factor storage devices.

For this purpose a lever 516 (Fig. 4), fulcrumed upon the framing at 517, has pin and slot connection with the slide 502 and is also provided with a hooked extension normally holding in restraint a spring latching pawl 518, pivotally mounted upon a plate 519, loosely mounted upon the shaft 301. Upon forward movement of slide 502, pawl 518 will be allowed to fall upon an arcuate peripheral face of a plate 520 fixed to and reciprocating the arm 316. During the cycle of motor operation following the depression of multiplication key 501 plate 520 will rotate counterclockwise and latch pawl 518 will drop behind a shoulder of said plate, so that during the return stroke of arm 316 plate 519 will be rotated clockwise about shaft 301 and latched in its new position by a spring click 521.

Plate 519 is connected by link 522 with an arm 523, fixed upon a shaft 524 to which is also fixed an arm 525. In the normal position of the parts, illustrated in Figure 4, the end face of arm 525 engages an anti-friction roller mounted upon a plate 526 which carries a transverse rod 527, said arm being lifted and the plate freed from restraint thereby upon the initial movement of plate 519 (compare Fig. 8).

Rod 527 is fixed in the frame of a bail 528 (Figs. 10 and 12–14), lying in rear of a series of spring impelled segments 529, loosely mounted upon a shaft 530. Upon release of arm 525, the segment springs 531 will rotate the segments clockwise until feelers 532, pivotally connected thereto, come into contact with studs 533 of the adjusted stop plates 506 (Fig. 10).

The seven right-hand segments 529 mesh with intermediate gear members 534, supported upon a shaft 535 which is carried by a frame 536 rigidly mounted upon shaft 530. Gearing 534 normally meshes with gears 537, of which there are seven, each being rotatably connected to a series of five partial product plates 538 (Figs. 28, 31, 32), mounted upon a sleeve supported upon a shaft 539. Clockwise rotation of the related segments 529 will thus rotate the partial product plates 538, each series of plates a number of steps (from one to nine) in accordance with the multiplicand value set in the corresponding stop plate 506.

The seven left-hand segments 529 mesh with pinions 540 (Figs. 13, 14, 16), each rotatably connected to a series of three multiplier selection plates 541 (Figs. 13–15, 17 and 33) mounted upon a sleeve supported upon shaft 535. Advance of the related segments 529 will thus rotate the multiplier selection plates, each series of plates a number of steps (from one to nine) in accordance with the multiplier value set in the corresponding plate 506.

Figure 4:
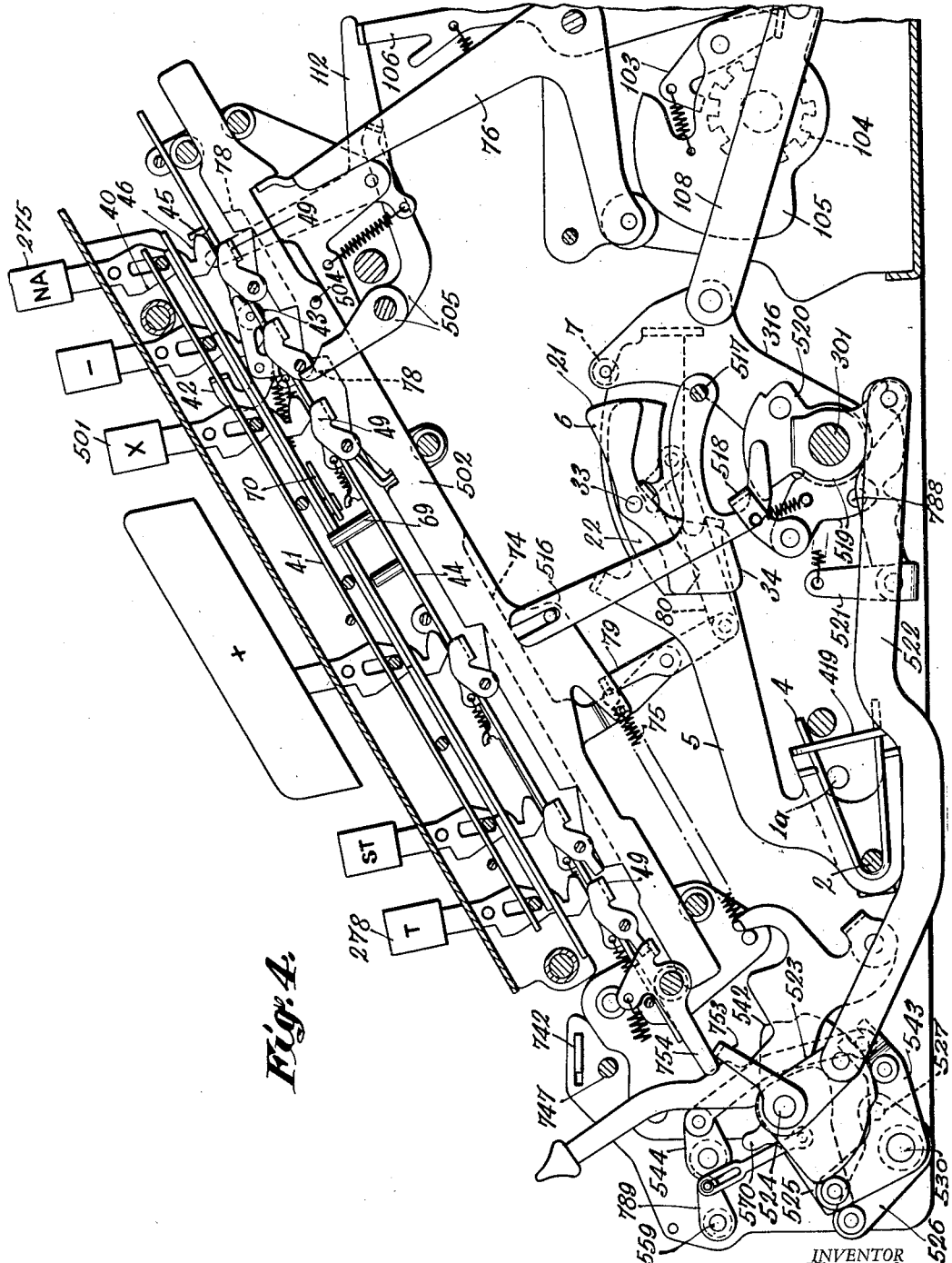
Fig. 4 is a right side elevation of the machine, with casing removed.

As has been stated, the semi-complemental system of multiplication employed requires that certain partial product registrations be effected subtractively and that the succeeding registration be controlled by a multiplier setting of enhanced value. These modifications of the multiplier settings derived directly from the stop plate 506 are effected as follows:

During the rotation of shaft 524 by plate 520, a cam 542, fast upon said shaft, will be carried from the position illustrated in Figure 4 to that shown in Figure 8, and near the end of this movement cam follower 543, rigidly mounted upon shaft 530, will be rocked counterclockwise, carrying therewith frame 536 (Fig. 10) and shaft 535. At the same time cam follower 543, through link connection with an arm 544, will rock a shaft 545 and thus move a bail 546 from the position illustrated in Figures 10 and 13 to that of Figures 12 and 14. This movement of bail 546 will free a series of multiplicand latches 547 and a series of multiplier latches 548 for spring impelled engagement with ratchet form teeth of the multiplicand gearing 534 and of the multiplier selection assembly 541, respectively, the primary function of these latches being to hold the parts in adjusted position after the release of the stop plates 506.

When multiplier values from one to four have been set in the plates 541, the ratchet teeth will engage the latches 548 early in the swinging movement of shaft 535, and, the plates being locked, the segments 529 will yield to accommodate the remaining movement of frame 536. When, on the other hand, multiplier values from five to nine have been set in any of the plates 541, engagement of the latches 548 related to the next higher order plates is delayed, and the pinions 540, rolling upon the segments 529, will advance said higher order plates another step.

This delayed engagement of the latches 548 is effected by means of plates 549, rotatably fast with the other multiplier selection plates 541, and of cooperating pawls 550, loosely mounted upon shaft 545. Pawls 550 are yieldably connected for movement in unison with latches 548 of the next higher order by means of springs and of stop pins 551, said pawls being the members held in engagement with bail 546 and urged toward the plate assemblies 541 by means of springs 552.

When no complemental settings are involved, pawls 550 will not interfere with the early engagement of latches 548 with the ratchet teeth of the plate assemblies, but where a given series of plates 541 has been advanced five or more steps by the related segment 529, plate 549 of this series will lie in the path of movement of the pawl 550 related to the next higher order series, and the pawl will act to hold its latch 548 out of engagement with the ratchet teeth until continued movement of frame 536 has rocked the pawl so far in a clockwise direction that a lug 553 of the latch 548 will engage a stationary frame, whereupon the ratchet teeth will be advanced into engagement with the latch, as shown in Figure 14. In this position of the parts, plate 549 will hold pawl 550 rocked clockwise beyond its normal position, this effect being utilized to set the controls to effect subtraction when the machine is operating under the control of the plates 541 related to the advanced plate 549. For this purpose a link 554 connects each pawl 550 with a series of three adjustable stop bars 555 (compare Fig. 20), normally engaging a notch of plus setting slide 556 but adjustable in the clockwise movement of pawl 550 with a notch of minus setting slide 557.

In order that the additional advance of plates 541 shall not entail further resetting in still higher orders, it is provided that when a series of plates has been advanced four steps by its segment 529, and receives an additional step of movement through the rocking of frame 536, the multiplication by five will be made positively, by additive registration of the partial product, as in multiplication by multiplier digits one to four. For this purpose, each plate 549 is cut away at its forward edge, and the lower end of pawl 550 is recessed, so that when a lower order series of plates is advanced four steps by segments 529, and is advanced an extra step under control of the next lower order plates, latch 548 related to the higher order plates will be allowed to engage the ratchet teeth without interference, the leading edge of the lower order plate 549 moving into the recessed portion of the higher order pawl 550, as shown in Figure 15.

As has been stated, the multiplier is selected by lateral displacement of the partial product plates 538, and this is controlled by the multiplier selection plates 541 through the medium of spring impelled feelers 558 (Figs. 10, 13, 14). These feelers are loosely mounted upon a shaft 559 and are normally held under restraint by a bail 560, the left hand arm of which is provided with a lug engaged by a spring latch 561 (Fig. 10). At its left-hand end shaft 535 is provided with a reduced portion 562 extending beyond the frame 536 (compare Fig. 16) and designed, as said shaft is swung to extreme forward position, to displace an intermediately fulcrumed lever 563 having link connection with latch 561, whereby the latch is tripped and the feelers rotated by their springs into contact with the plates 541. At their upper ends feelers 558 have pivotal connection with the stop bars 555, so that contact of the feelers with differently stepped or graded faces of the plates 541 will effect a greater or less retraction of the bars from their normal rearward position of adjustment.

The stop bars 555 provide selective stopping abutments for an escapement pawl 564 (Figs. 10, 14, 19, 20) mounted in the carriage 565 of the partial product plates. This carriage is supported upon shaft 539 and guided by contact with a shaft 566, with which pawl 564 has splined connection. Normally, carriage 565 is held to the right, in the position illustrated in Figure 16, by a latch 567 (Figs. 10, 18) engaging a fixed frame plate of the machine, being thus held against the bias of a shifting spring 568 (Fig. 22), connected with the carriage by a lever 569.

Upon completion of the rocking movement of shaft 524 (Fig. 4), which has entered the factors in the manner above described, a projection 570 of arm 525, moving from the position illustrated in Figure 7 to that of Figure 8, will contact with a lever 571 which has pin and slot engagement with a compound tripper arm 572, extending beneath latch 567, lifting said latch end freeing the carriage 565.

The plates 538 representing the products of the multiplier digits 1–9, 2–8, 3–7, 4–6 and 5 are arranged in that order, from left to right of each group, and the desired multiplier is selected by arresting the carriage 565 in one of five positions. For this purpose, escapement pawl 564 if formed with two offset contact faces, one face contacting with the first, second or third stop bar of a given group in their fully projected positions, as indicated in dotted lines, Figure 19, to set for a multiplier of 1–9, 2–8, or 3–7, respectively, and the second face contacting with the second or third stop bar in their semi projected positions to set for a multiplier of 4–6 or 5. When all of the stop bars of a group are fully retracted, representing a zero in the multiplier, the escapement pawl 564 will not contact with them, and the carriage 565 will be moved to the left, into a registering position of higher order.

Registering the partial products

Contact of escapement pawl 564 with a stop bar 555 will not only set the selected partial product plates 538 in controlling position but will also engage a clutch to initiate plus or minus registration of the partial products, depending upon location of the engaged stop bar in a notch of plus setting slide 556 or of minus setting slide 557.

These slides are mounted in the framing of the machine and are allowed a limited leftward movement, against the tension of springs 573 (Fig. 19). The pivotal connections between feelers 556 and stop bars 555 allows for a slight lateral play, so that upon contact of escapement pawl 564 with a bar, the latter will yield leftward, the carriage shifting spring 568 overcoming the tension of the setting slide spring 573 and moving the engaged plus or minus setting slide to the left. The parts will be held against rebound by a pawl 574 (Fig. 22), engaging a ratchet 575 fixed upon the carriage shifting lever 569.

The connections between the two setting slides and the plus and minus elements of the clutch are substantial duplicates, and a description of one will suffice for both.

A pawl 576 (Fig. 21), engaging a stud of the setting slide, is pivoted upon and forms an extension of a bell-crank lever 577, mounted upon the machine framing, said lever having an arm engaging one arm of a bell-crank lever 578 (Figs. 19, 21, 23). Leftward movement of the setting slide will be transmitted through bell-crank levers 577 and 578 and link 579 to a clutch control latch 580. Latch 580, having been operated, will immediately be released by contact of a tail of pawl 576 with the framing, whereby said pawl will be rocked against the tension of its spring, out of contact with the stud of the setting slide, whereupon bell-crank lever 578 will be restored by spring action.

The forward and reverse drive clutch is shown as corresponding to the disclosure of U. S. patent application Serial No. 504,766, filed by Loring P. Crosman on October 2, 1943, and issued on February 5, 1946, as Patent No. 2,394,429. Figure 23 shows the clutch parts in normal or released position, and Figure 24 shows the addition clutch pawl engaged and the parts in mid-cycle position.

Displacement of the addition clutch control latch 580 will release a spring urged rocker 581, bringing a lug thereof into contact with lug 582 of a retainer arm 583, which arm will be rocked to move a flange thereof from beneath a spring urged releasing pawl 584. Being freed from the flange of arm 583, pawl 584 will act to withdraw a detent 585 from restraining engagement with addition clutch pawl 586, which will thereupon drop, under the urge of spring 587, into engagement with a toothed driving clutch element 588. The clutch is limited to a single cycle of operation as follows: Fast with the drum 589 upon which the pawl 586 is mounted is a cam 590 which upon rotation of the parts will contact with a stud of spring urged arm 591, rocking said arm clockwise about its pivot 592. Arm 591 has a spur engaging releasing pawl 584 and a lower extension engaging rocker 581, displacement of the arm restoring these parts, together with detent 585, to normal position, whereupon retainer arm 583 will be restored by its spring into restraining engagement with releasing pawl 584. Detent 585, being thus held in its normal position, will be contacted by clutch pawl 586, at the end of the cycle, and the clutch pawl will be lifted from engagement with driving clutch element 588.

A train of reduction gearing 592 (Fig. 27) connects the motor shaft 101 with a shaft 593 upon which are mounted gears 594, 595 (Fig. 16), gear 594 meshing with a gear fast upon the shaft of subtractive driving clutch element 596 and gear 595 having connection through idle pinion 597 with a gear fast upon the aligned shaft of the additive driving clutch element 588. The two driving clutch elements are thus rotated in opposite directions, carrying the driven drum 589 forwardly or reversely, upon engagement of the respective clutch pawl 586 by the action of the additive setting slide 556 or the subtractive setting slide 557.

Release of the subtraction clutch control latch 580 will result in a rocking of retainer arm 583 in a direction opposite to that of the operation above described, freeing the subtraction releasing pawl 584 and thus effecting engagement of the substractive clutch pawl 586 with driving element 596.

In addition to the engagement of the multiplication clutch, leftward movement of carriage 565, upon release of latch 567, will effect closure of a switch 660 (Fig. 27) in a motor circuit parallel with the circuit controlled by the lister switch 110. Switch 660 is closed by an arm 661 (Fig. 22), yieldably mounted upon carriage shifting lever 569 and having pivotal connection with a slide 662. A perforation of slide 662 is engaged by the beveled end of a pin 663, mounted in a plate 664, pivoted at 665 upon the framing. Movement of lever 569 and arm 661 will cam the pin 663 out of the perforation of slide 662, forcing plate 664 against one of the spring leaves of switch 660 and closing the circuit.

Means may be provided for locking the clutch retainer arm 583 in central position until product calculation is initiated, so that a clutch releasing pawl may not be freed from restraint by any jarring of the machine. For this purpose, a spring pressed latch 598 (Fig. 22) normally engages a depending extension of retainer arm 583 (Fig. 23), said latch being released, upon movement of slide 662, by engagement of a plate 599, fixed upon said slide, with a cam shoulder of the latch. During the movement of carriage 565 plate 599 will hold the latch in disengaged position, but upon restoration of said carriage to extreme right-hand position latch 598 will reengage retainer arm 583.

Fast with the multiplication clutch drum 589 is a gear 666 (Figs. 16 and 23) meshing with a gear fast upon an operation control shaft 667 upon which are mounted a series of cams which act to determine the calculation and registration of the partial product values.

Cam 668 (Fig. 9) operates the units value feelers, this being the first operation effected during additive calculations (see diagram, Fig. 35). A spring urged cam follower 669 is rocked counterclockwise by cam 668, said follower, through link 670 and bell-crank lever 671, rocking a shaft 673. Shaft 673 has link connection 672 with a pair of arms 675, supported upon shaft 674 (Figs. 10 and 28) and having pivotal connection 676 with a pair of hangers 677 (Fig. 11) engaging perforations of two spaced bars 678, riveter together to form a rigid frame. This frame has yieldable connection with the units feelers 679, 680, there being a pair of such feelers related to each accumulator wheel unit. Each yieldable connection comprises a link 681, pivotally connected with its feeler and having a slotted extremity engaging a notched portion of one of the bars 678, a spring 682 bearing against a shoulder of the link and against the bottom of the bar. Upon rocking movement of shaft 673 frame bars 678 will be depressed, and feelers 679, 680 will be rocked about their pivot 683, each pair into contact with the selected partial product plate 538 of its related group, the springs 682 yielding when such movement is interrupted by contact of a feeler with the plate.

Two units feelers are employed in each order, and their settings are combined to provide for a differential one to nine step counterclockwise rotation of the related auxiliary or multiplication actuator segment 684, in order to reduce the number of graded steps of the partial product plates, with a consequent permissible reduction of diameter. This arrangement, which forms the subject of a co-pending application of Loring P. Crosman, Serial No. 629,777, now Patent No. 2,414,027, filed of even date herewith, is not essential to the present invention, but forms part of the preferable embodiment thereof.

The settings of the two feelers are combined as follows:

Feeler 679 has pin and slot connection with the outer end of a pivoted arm 685, mounted upon a plate 686 supported upon the auxiliary actuator shaft 687, arm 685 being provided with a stop lug 688 designed for contact by one of a series of graded stop shoulders of the actuator segment 684, the shoulder making contact being determined by the degree of clockwise adjustment of the feeler. The shoulders of the segment are so spaced as to provide for 0, 3, 6, or 7 steps of movement, controlled by four evenly graded steps of the partial product plate. Feeler 680 is provided with a stop lug 689 designed for contact with one of a series of three evenly graded stop shoulders of the plate 686, the shoulder making contact being determined by counter-clockwise adjustment of the feeler, controlled by three evenly graded steps of the partial product plate. Upon contact of the segment with stop 688 plate 686 will be carried counter-clockwise, against the tension of its spring 690, so that the pivotal support of arm 685 will be carried forward to allow for 0, 1 or 2 steps of movement of the actuator segment. Therefore, by combining the settings for 1 or 2 steps of movement with the settings for 3, 6 or 7 steps any of the digits from 1 to 9 may be registered.

The tens feelers 691, which control the registration of the tens values appearing in the upper lines of the boxes of Figure 34, are operated by a cam 692 (Figs. 16 and 25), through a spring cam follower 693 having link connection with an arm 694, fast upon shaft 695. Keyed to shaft 695 is a series of arms 696 (Figs. 10, 28 and 30) having yieldable drive connection by means of the transverse spring 697 with a series of stops 698, loosely mounted upon shaft 695 and having each pin and slot connection with a tens feeler 691. The stops and feelers are normally located by contact of the stops with overlying lugs of the arms 696. The rear ends of stops 698 are designed to be contacted each by one of a series of five graded stop shoulders of the actuator segments 684, in accordance with the contact of feelers 691 with one of a series of five graded steps of the partial product plates (see plate 5×, Fig. 32), to provide for registration of the values 0, 1, 2, 3, 4, upon clockwise rotation of the segments. During these operations the partial product plates are held in set position by spring detents 699 (Figs. 10 and 19) engaging the gears 537.

The auxiliary actuator segments 684 are driven by a pair of complemental cams 720 (Figs. 9, 16), through cam follower 721, link 722, arm 723 and shaft 724. Shaft 724 has yieldable drive connection with a series of segments 725 (Figs. 10, 28, 29), the connection being effected by a series of U-shaped plates 726, having each spline connection with the shaft and lugs upon its opposite arms normally engaging the opposite ends of a spring 727, said spring also normally engaging lugs of two adjacent segments 725. This arrangement provides a yieldable drive of the segments upon rocking movement of shaft 724 in either direction from the normal position illustrated in Figure 10. Each segment 725 meshes with a pinion 728 having fixed connection with one of the auxiliary actuator segments 684, so that the latter segments will be driven against the feeler connections upon movement of shaft 724.

During each calculating cycle, the accumulator pinions 403 will be meshed with and unmeshed from actuator segments 684 under control of a cam 729 (Figs. 16 and 25). Cam 729 acts through cam follower 730 to rock an arm 731, fast with one arm of the toggle 19 which, as previously described, has connection with the accumulator shaft 472.

The successive actions effected by the calculation controlling cams shown in Figure 16 may be traced on the diagram, Figure 35, as follows:

During an additive cycle of operation (reading from left to right, Figure 35), cam 668 first operates the units feelers to position the stop lugs 688 and 689 (Figs. 10, 28) in accordance with the units values. Cams 720 then act to rotate the auxiliary segments 684 counter-clockwise, into engagement with lugs 688, in which position the segments will be held while cam 729 acts to move the accumulator pinions 403 out of mesh with the lister actuator segments 619 and into mesh with the auxiliary actuator segments 684 and while cam 692 acts to operate the tens feelers to position the stops 698 in accordance with the tens values. This is the position of the parts illustrated in Figure 28, the dot dash showing of segment 684, indicating a registration of nine and the fragmentary full line showing indicating a zero. Cams 720 will now act to rotate the segments 684 clockwise to their normal position, to register the units and beyond said position, into contact with the stops 698 to register the tens, a maximum of thirteen steps of movement. Cam 668 will now retract the units feelers and cams 729 will unmesh the accumulator pinions from segments 684 and mesh them again with the lister actuator segments 619, during which time the segments 684 will be held stationary. Cams 720 will next return the auxiliary actuator segments 684 to and slightly beyond their normal position, to afford clearance with the tens stops 698, which are then restored by cam 692. Finally, the segments 684 are moved through the true neutral position into their normal position of rest, in which clearance is provided with the units lugs 688.

This succession of operations is reversed by reverse rotation of the control cams 668, 720, 729,

692, during subtractive calculations (reading from right to left, Figure 35), the tens values being first computed, and the effective movement of the auxiliary actuator segments being counterclockwise, effecting reverse rotation of the accumulator wheels.

At the end of each calculating cycle carriage 565 is released for leftward movement by the shifting spring until escapement pawl 564 contacts with the next adjusted stop bar 555 of a higher order. The means for effecting this release is operated by the forwardly or reversely driven shaft 667 (Figs. 16 and 23) and includes a lost motion device whereby the release is effected at the end of the cycle, whether additive or subtractive in character, as indicated by the full and dotted lines on the diagram, Figure 35.

The driving element of this device comprises a disk 732 having a pin 733 designed to engage a tooth of driven arm 734, said arm in turn having pin and slot connection with a bevel ended finger 735. Pin 733 will engage one or the other of the lateral faces of the tooth of arm 734 and at the end of the cycle of rotation will move the beveled end of finger 735 into contact with and past a lug formed on a lever 736. Lever 736 has yieldable spring connection with a bar 737 (Figs. 23, 25) provided with a tooth designed to engage a pin of arm 738, fast upon the escapement pawl shaft 566, upon displacement of lever 736. Following this operation, release of lever 736 by finger 735 will allow a spring 739 to restore bar 737, shaft 566 being momentarily held in rocked position by a detent spring 740 and restored by contact of a beveled tooth 741 (Fig. 20) of detent pawl 564 with a beveled tooth of rack 742, mounted in the stationary frame.

Contact of pawl 564 with an adjusted stop bar of higher order will effect selection of the next multiplier digit value and will initiate the next calculating cycle, all as previously set forth.

As the partial product plates are moved laterally relative to the auxiliary actuator segments it is necessary to block the movement of the feelers 679, 680 and 691 in those orders where no plates are located, for which purpose right and left-hand plates 743 (Figs. 10 and 16) are secured upon the ends of a bar 744 forming part of the frame of carriage 565, these plates lying in the paths of movement of the feelers in question. It may also be noted that the extreme right hand segment 684 receives no tens value from a lower order and therefore never moves below its neutral position, a pin 745 (Figs. 10 and 30) serving to prevent such movement.

*Example*

The operation of the partial product calculating mechanism above described may be illustrated by following through the actions involved in the calculation of the previously noted example, 394×775.

Upon release of the carriage 565 from the restraint of latch 567 it will be brought to rest with the escapement pawl 564 in contact with one of the group of stop bars 555 of the units order. In this order the multiplier selection plates 541 (Fig. 33) have been advanced four steps, to represent a multiplier value of four. The two left-hand plates therefore will present intermediate steps and the right-hand plate will present a short diameter step to the feelers 558, and the stop bars will be positioned as illustrated in the fourth group from the right in Figure 19, bringing the partial product plates marked 4× in Figure 32 opposite the feelers 679, 680 and 691.

Three of the partial product plate groups have been advanced to represent the multiplicand, the groups in the hundreds and tens orders seven steps and the units order group five steps. In the hundreds order feeler 679 (Fig. 10) enters two steps in contacting the plate 538, positioning the lug 688 opposite the third shoulder inward from the periphery of segment 684, to represent the value six. Feeler 680 enters two steps, bringing lug 689 opposite the outer shoulder of plate 686, and thus allowing two extra steps of counterclockwise movement of the segment, which, added to the six steps allowed by feeler 679, gives a total of eight steps to represent the units value of the partial product 28. Feeler 691 enters two steps in contacting plate 538, providing for two steps of movement of the thousands segment 684. In the tens order the feeler actions are the same, except that the units and tens of the partial product are registered in the tens and hundreds order, so that, in the hundreds order, segment 684 is allowed eight steps of counterclockwise movement and, during the return or clockwise stroke will move eight steps to its neutral position plus two steps beyond that position, giving a registering movement of ten steps. Finally, in the units order, where the partial product plates were advanced five steps, feelers 679 and 680 are held on the extreme outer surface of plate 538, to provide for contact of the outer shoulder of segment 684 with lug 688 and plate 686 is held against movement, so that no counterclockwise movement of segment 684 can occur. Feeler 691 however enters two steps, so that an additional two step movement of the tens order segment 538 is provided for, representing the partial product 20. Thus during the first calculating cycle, the four right hand segments 538 will register the values 2800, 280 and 20, which will be accumulated as 3100.

The next multiplier being nine, the partial product table is used complementally, by substituting +10×, −1× for +9×. Therefore nine steps of setting movement of the group of plates 541 located in the tens multiplier order has located an extreme outer surface of all three plates opposite feelers 558, so that the three stop bars 555 will remain fully projected, as illustrated in the right hand group, Figure 19, and the partial product plates marked 1×, will be held in line with the feelers 679, 680 and 691 during the second calculating cycle. The movement of the carriage 565 which has selected the second multiplier has also shifted the set up multiplicand into the thousands, hundreds and tens orders.

The registration to be effected in the second cycle is 7750, in effecting which the tens feelers 691 are prevented from making any effective movement by contact of each feeler with a long radius surface of the related plate 538. In the thousands and hundreds orders, in each of which the partial product is seven, feelers 679 enter two steps, to provide for a registration of six, as previously explained, and the feelers 680 enter one step, to extend such registration to seven.

The registration of the value 7750 is to be performed as a subtraction, for which purpose the stop bars in this tens order have been engaged with the slide 557 during the preliminary setting cycle of the machine, by the action of plate 549 and pawl 550, contact of the carriage with the stop bar thus moving slide 557, instead of slide 556, and effecting reverse rotation of the control cams. Therefore, during the second calculating cycle 7750 is subtracted from 3100, leaving a negative reading in the accumulators, for the time being.

The group of plates 541 in the hundreds order were rotated three steps in the preliminary setting cycle, to represent the multiplier digit 3× and an additional step of movement as frame 536 was swung forward to the position illustrated in Figure 14, to represent the 10× carried up from the lower order. Therefore the complete setting gives a rotation of four steps to plates 541, and the movements of the hundred thousands, ten thousands, thousands and hundreds segments 684 during the third calculating cycle will be the same as that of the four right hand segments during the first cycle. During this third cycle the value 310000 will be added to the negative value standing in the accumulator, giving the completely registered product 305350.

To complete the description of the application of the calculating mechanism to the performance of any required operation, it is pointed out that the graded steps of the plates 541 are symmetrically disposed, counterclockwise, step by step rotation of each group of plates giving successive selection of the partial product plates, 0, 1×, 2×, 3×, 4×, 5×, 4×, 3×, 2×, 1×, 0. Consideration of this order of succession, together with the previous explanation as to the change from plus to minus sign, and the additional advance of higher order plates 541 to represent the value + 10×, will make it apparent that this advance of a higher plate may raise the value of the selected multiplier either by transfer to a higher value partial product plate for additive registration or to a lower order plate for subtractive registration. It will also be apparent that in additionally advancing a plate 541 standing at nine, the corrected or merged value will be ten, with the plate in question providing for zero and the carriage 565 passing through the corresponding multiplier order without engaging the multiplication clutch.

*Printing the product*

Upon release of the escapement pawl 564 from the last set stop bars 555, carriage 565 will be drawn to an extreme left-hand position, whereupon a clutch will be engaged to effect initiation of a total taking cycle of the listing mechanism; return of carriage 565 to the right, and restoration of the calculating mechanism to normal position.

During the preliminary setting cycle described under the heading "Entering the factors," the total taking mechanism is preset for operation upon completion of the calculation, by means of a lever 746 (Fig. 7), supported upon a shaft 747 and normally held in counter-clockwise adjusted position, against the tension of a spring 748, by an arm 749 of shaft 524. When shaft 524 is rocked, during the factor setting operation, arm 749 will be moved away from lever 746 and spring 748 will rock said lever clockwise. This movement will be transmitted through link 750 to a lever 751, fulcrumed concentrically with the latch 112 of the lister clutch. The upper end of lever 751 engages the operation key latching slide 41, while a rearward extension of the lever is provided with a latching shoulder 752, designed for engagement with clutch detent 106, and with a luge underlying latch 112. Upon movement of levers 746 and 751, slide 41 will be held forward, and through lever 42 (Fig. 4) roller 43 will be held inactive, thus allowing slide 44 to advance and lock all of the operating keys against depression. Normally, advance of slide 44 would release clutch detent 106 and thus effect engagement of the lister clutch, but in the present case the latching shoulder 752 of lever 751 will continue the restraint of said detent during the calculating operations.

Rocking of shaft 524 during the preliminary setting cycle will also engage the bail 49 related to the total key 218 with the corresponding notches of the operation controlling slides, this being effected by an arm 753 (Fig. 4) of shaft 524, which will be moved away from normal restraining engagement with a spring urged rocker 754, having a lug underlying said bail 49. Thus, during the calculating operations, rocker 754 will hold the total bail 49 in operated position, ready to control a total taking operation upon engagement of the lister clutch.

At the end of the preliminary setting cycle cam 318 (Fig. 9), in returning to normal position, will bring pin 514 into contact with and disengage latch 513 from lug 511, and locking shaft 509 will be restored by spring 515 to the position illustrated in Figure 2, so that the locking plates 506 may be freely depressed, as may be necessary in zeroizing the accumulator wheels.

The product printing and restoring operations will be initiated as follows:

As carriage 565 advances toward the left, slide 662 (Fig. 22) will be moved from the position illustrated in Figure 27 to that shown in Figure 26, the final step of movement bringing a lug 755 of said slide into operating engagement with the lower arm of an intermediately fulcrumed lever 756. The upper arm of lever 756 lies beneath a roller mounted upon one link of a toggle 757, supported upon the stationary framing and normally holding a spring energized clutch tripping arm 758 under restraint. Upon operation of lever 756 toggle 757 will be broken and arm 758 will rock clockwise about its supporting shaft 759, carrying clutch detent 760 out of restraining engagement with a spring urged clutch pawl 761, said pawl thereupon falling into engagement with a toothed driving clutch member 762. Clutch pawl 761 is mounted upon a drum 763, to which is connected a gear meshing with a gear 764, mounted upon shaft 765. Fast with gear 764 is a cam 766, acting upon a cam follower 767 having link connection 768 with an arm 769 of shaft 747. Thus, upon engagement of the clutch 761, 762, shaft 747 will be rocked, an arm 747' of said shaft contacting a pin of link 750 and thus moving the linked levers 746, 751 (Fig. 7) and releasing the lister clutch detent 106 for retraction by its spring out of restraining engagement with clutch pawl 103. This will initiate so much of the total taking action as serves to rotate the accumulator wheels to zero and to set the product value in the type bars 611.

Before the total is printed, however, carriage 565 is returned to its extreme right hand position, since the return stroke of the listing actuator mechanism is utilized to restore the factor storage devices and partial product plates to normal position, which must be effected with the parts in the same relation in which they stood during the entry of the factor values. Meanwhile, the total cycle is interrupted by the action of detent 86 and latch 84, as previously described.

Carriage 565 is returned to its right-hand position by a rod 780 (Figs. 26, 27), pivoted at one end upon the gear 764 and provided at the other end with a pin engageable with the forward wall of a slotted extension 781 of slide 662. Thus during the first half cycle of clutch 761, 762, the carriage will be returned and reengaged with its latch 567.

In order that the carriage may be returned without interference, pawl 574 (Fig. 22) is lifted from ratchet 575 by the action of a cam 782 (Figs. 26, 27) upon cam follower 783, said follower engaging an upper extension of the pawl. Also escapement pawl 564 is rocked out of engagement with the stop bars 555 (Fig. 20) and rack 742 is kept out of engagement with said pawl during the carriage return. For this purpose bar 737 (Fig. 25) has pin and slot engagement with an arm 784 of shaft 747, so that as said shaft is rocked by the action of cam 766 (Fig. 27) bar 737 will be moved rearwardly, and the tooth of said bar will rock the escapement shaft 566. Shaft 747 is also provided with arms 785 (Fig. 20) engaging perforations of the rack bar 742, so that as the shafts 566, 747 are rocked, bar 742 will be carried back and will not be engaged by the escapement pawl.

Control of the completion of the total taking cycle is effected not only by the latch 84, described under the heading "Total taking," but additionally by a bar 786 (Figs. 7, 8, and 16), pivotally connected to the clutch detent 86 and supported at its forward end in a slotted bracket 787, said bar being freely movable with the detent so long as the carriage 565 stands in its normal rightward position. Leftward movement of the carriage, however, at the beginning of a product calculation, will remove pressure of the carriage frame from a spring urged pivoted stop plate 788, which will thereupon be pressed against the forward portion of bar 786. Upon movement of detent 86 to active position, at the beginning of a total cycle, rod 786 will be retracted and stop plate 788 will move in front of it, preventing withdrawal of said detent, even though latch 84 should be released, until the carriage is fully returned, whereupon the carriage frame will contact plate 788 and withdraw the same from in front of bar 786. Detent 86 will therefore be retracted, to release clutch pawl 103, only when latch 84 and stop plate 788 have been withdrawn.

Upon the completion of its cycle, clutch 761, 762 is disengaged as follows: One of the side plates of clutch drum 763 is formed as a cam, as seen in Figures 26, 27, an extension of one of the links of toggle 757 falling to the low point of this cam as the toggle is broken. Rotation of drum 763, acting upon this extension, will restore the toggle, whereafter detent 760 will ride upon the periphery of the clutch drum until the cycle is completed, when it will fall through a cut away portion of the peripheral wall and engage pawl 761, so that a slight additional rotation of the drum will disengage pawl 761 from the teeth of driving member 762.

The factor and partial product settings will be canceled by the restoration of the parts to zero position during the resumed operation of the total taking means, in the following manner:

At the end of the preliminary setting cycle the plate 519 (Fig. 4) was left in clockwise rocked position, with latching pawl 518 in engagement with plate 520, while lever 516 was restored to normal position by the retraction of slide 502. Upon the resumption of the total taking cycle plate 520 is carried forward, the forward edge of said plate engaging a pin 788 of plate 519 and, through link 522, restoring shaft 524 to normal position. Moving with shaft 524, arm 753 will restore rocker 754; cam 542 will restore cam follower 543 and frame 536 (Fig. 10), and cam 525 will restore plate 526, bail 528 and segments 529. Also, follower 543, through its link connection, will restore shaft 545, with latches 548 and pawls 550, and cam 525, through a link having pin and slot connection with an arm 789 of shaft 559, will restore the feelers 558.

Thus, the latches 548 being removed and the factor setting elements reconnected with the partial product plates, the segments 529 will act to restore the parts to zero position.

The machine is so designed that new digit keyboard settings may be made while a multiplication problem is being computed. This is made possible, first, because the actuator segments 610 of the adding and listing mechanism remain stationary during calculation of the product, secondly, because of the displacement of the index bars 615 during a total taking operation, and finally because a forwardly extending spur of the total key bail 49 (Fig. 4) is moved upon operation of said bail into the path of movement of slide 44, preventing return movement of said slide past its normal position, to clear the keyboard. It has been seen that, in multiplying operations, bail 49 is rocked during the preliminary setting cycle, but provision is made, nevertheless, for clearing the factor settings from the key board at the end of this cycle. For this purpose, a high portion of slide 502 will hold this bail 49 out of its active position until slide 44 has been retracted beyond its normal position and the keyboard cleared, whereafter slide 502 will be restored and bail 49 allowed to move into operative position.

The product having been printed and the calculating and listing mechanisms restored to normal position during the total taking cycle, the machine will come to rest at the end of such cycle, ready for the next operation.

I claim:

1. In a multiplying machine having multiplier and multiplicand value entering means, partial product plates comprising ordinal units each individually settable by the multiplicand entering means and each unit comprising sections representing each the partial product values related to a given multiplier digit and to its complemental digit, and means for registering selected partial product values positively or alternatively negatively; multiplier selection means including elements settable by the multiplier entering means to determine the sequential selection of individual plate sections representing the normal values of given entered multiplier digits or alternatively the complemental values of other entered multiplier digits, latches engageable to hold the selection elements in set positions, means settable with the multiplier selection elements to determine negative registration of partial products derived from complementally significant multipliers, and means cooperating with the last named means including yieldably operative advancing means for the selection elements and pawls controlled each by a selection element to hold out the latch of the selection element of next higher order to permit a single step of movement of said element to thereby set the multiplier selection means to control registration of a value in accordance with a multiplier digit setting as augmented by one.

2. A multiplying machine according to claim 1 and in which the multiplier selection elements include rotary units, and in which the multiplier entering means comprises gearing operable to move said units through one or more steps of progressive rotation corresponding to entered multipliers of arithmetically progressive value, the units so set acting to select individual partial product plate sections representing the normal or alternatively the complemental values.

3. A multiplying machine according to claim 1 in which the multiplier selection elements include rotary units in which the multiplier entering means comprises gearing operable to move said units through one or more steps of progressive rotation corresponding to entered multipliers of arithmetically progressive value, the units so set acting to select individual partial product plate sections representing the normal or alternatively the complemental values, and in which the means settable with the multiplier selection elements to determine negative registration of partial products derived from complementally significant multipliers is operable upon rotation of a lower order multiplier selection unit through five steps of movement to advance the unit of next higher order one step.

4. In a multiplying machine having a product register, multiplier and multiplicand value entering means, partial product plates comprising units each individually settable by the multiplicand entering means and each unit comprising sections representing each the partial product values related to a given multiplier digit, and actuators operable to register selected partial product values positively or alternatively negatively; multiplier storage means including elements individually settable by the multiplier entering means each to determine the sequential selection of individual plate sections representing the normal values of given entered multiplier digits or alternatively the complemental values of other entered multiplier digits, means settable with the multiplier storage elements to determine negative registration of partial products derived from complementally significant multipliers, means cooperating with the last named means to change the setting of the multiplier storage element of next higher order to control the selection of a multiplier of next higher digital value, and means operable to shift the partial product plates and the register relatively to each other and to concomitantly bring the multiplier storage elements successively into control to select the appropriate plate sections.

5. A multiplying machine according to claim 4, and in which the negative registration control means comprises a series of elements individual to the multiplier storage elements, and in which the multiplier value entering means acts to set all of the designated storage and negative control units and to change all of the designated multiplier digit settings in a single preregistering operation.

6. A calculating machine according to claim 4 in which the multiplier storage elements are settable by progressive steps to determine progressive positive values and thereafter to determine regressive negative values, and in which a means for changing the setting operate invariably to advance the higher order storage elements one step.

7. In a multiplying machine having a product register, actuators therefor operable to register values positively or alternatively negatively, multiplier and multiplicand value entering means, ordinally shiftable partial product plates comprising units each individually settable by the multiplicand entering means and each unit comprising laterally spaced indexed plate sections representing each the partial product values related to a given multiplier digit and to its complemental digit, and feelers operable to contact the indexed portions of the plate sections to control the extent of movement of the related actuators in accordance with the indexed values; multiplier selection means including an ordinal series of stop devices settable each by the multiplier entering means to arrest the shifted partial product plates with a plate section of each unit representing the normal values of given entered multiplier digits or alternatively the complemental values of other entered multiplier digits opposite the feelers, an ordinal series of control devices settable by the multiplier entering means and cooperating with the stop devices to determine negative registration of partial products derived from complementally significant multipliers, and a series of supplemental devices cooperating each with a set control device and acting to reset the stop device of next higher order to provide for the automatic registration of a value relative to a multiplier digit value setting in said order as augmented by one.

8. A calculating machine according to claim 7, provided with a contact member shiftable with the plates and formed with stepped contact faces, and wherein each stop device comprises a series of laterally spaced stops selectively adjustable into position wherein a selected stepped face will contact with a selected stop.

9. A calculating machine according to claim 7, provided with positive and negative registration initiating means selectively operated upon arrest of the shiftable plates, in accordance with the position of the negative registration control device associated with the active stop device.

10. A calculating machine according to claim 7, and in which positive and negative registration initiating members are provided, and in which each negative registration control device adjusts the related stop device out of engagement with the positive registration member and into engagement with the negative registration member, said stop devices being yieldable laterally to effect operative movement of the engaged registration initiating member.

11. A calculating machine according to claim 7, and in which the stop devices comprise longitudinally slidable members, and the multiplier selection means further includes indexed plates settable by the multiplier entering means, and feelers operable to contact said plates and slidably set the stop members in accordance with the indexed values.

12. A calculating machine according to claim 7, in which the multiplier selection means includes storage elements settable by the multiplier entering means to accord with the normal or alternatively the complemental multiplier values, and means for transferring the set values to the stop devices; in which the automatic registration means comprise devices operable, each upon complemental setting of a storage member to change the setting of the storage member of next higher order to represent a multiplier of next higher digital value, and in which the multiplier value entering means operates first to set the designated storage elements and to change the designated higher order settings and thereafter to operate the transfer means.

13. A multiplying listing machine having a register, and reciprocatory actuators therefor; auxiliary actuators for said register, means for effecting a driving connection between the reciprocatory actuators and alternatively between the auxiliary actuators and the register, partial product plates shiftable relative to the reciprocatory actuators and to the auxiliary actuators, multiplier and multiplicand entering means including a series of indexed stops fixed in relation to and settable by the reciprocatory actuators, and feelers operable to contact the stops and to set the partial product plates in accordance with the graded movements of the reciprocatory actuators, said auxiliary actuators being operable under control of said plateos to accumulate product values in the register.

14. A multiplying listing machine having a register, cyclically operable actuators therefor, printing means including type bars, a keyboard controlling differential movement of said actuators and type bars, automatic keyboard clearing means, total taking devices cooperating with said actuators, and means for disassociating said keyboard control from said actuators during total taking operations; settable factor storage devices, factor entering means settable to cooperate with the cyclic actuators to set values in the storage devices, means for thereafter automatically disabling the clearing means, auxiliary actuators for said register differentially controllable by the set factor storage devices and operable independently of the cyclic actuators, means for effecting a driving connection between the cyclic actuators or alternatively between the auxiliary actuators and the register, and program means including driving elements operable to effect a series of successive actions including first, operation of the cyclic actuators with concomitant operation of the factor entering means, second, operation of the keyboard clearing means and thereafter of the disabling means, third, registering operation of the auxiliary actuators and, fourth, operation of the total taking means.

15. A multipyling listing machine according to claim 14, in which the factor entering means includes a series of index stops settable by the cyclic actuators, feelers operable to contact the stops and to set the factor storage devices, means operable to lock the index stops in set positions, and means operable at the end of the factor setting cycle of the actuators to release the index stops from the lock.

HOWARD M. FLEMING.

REFERENCES CITED

The following references are of record in the file of this patent:

UNITED STATES PATENTS

| Number | Name | Date |
| --- | --- | --- |
| 1,341,049 | Enberg | May 25, 1920 |
| 1,966,584 | Gardner | July 17, 1934 |
| 2,282,121 | Durfee | May 5, 1942 |
| 2,335,368 | Uhlmann | Nov. 30, 1943 |
| 2,342,529 | Chase | Feb. 22, 1944 |
| 2,374,333 | Crosman | Apr. 24, 1945 |
| 2,403,480 | Clary et al. | July 9, 1946 |